United States Patent [19]

Ethington

[11] Patent Number: 5,681,234

[45] Date of Patent: Oct. 28, 1997

[54] AUTOMATIC TRANSMISSION SHIFTER FOR VELOCIPEDES

[76] Inventor: Russell A. Ethington, 190 Garfield Pl.-#5F, Brooklyn, N.Y. 11215

[21] Appl. No.: 771,969

[22] Filed: Dec. 23, 1996

Related U.S. Application Data

[62] Division of Ser. No. 514,657, Aug. 14, 1995, Pat. No. 5,599,244.

[51] Int. Cl.$^6$ ....................................................... F16H 9/06
[52] U.S. Cl. .............................. 474/70; 474/81; 280/261
[58] Field of Search ........................... 474/69–71, 79–81; 280/259–261

[56] References Cited

U.S. PATENT DOCUMENTS

| | | | |
|---|---|---|---|
| Re. 30,758 | 10/1981 | Lang | 474/80 |
| 3,769,848 | 11/1973 | McGuire . | |
| 3,830,521 | 8/1974 | Gardel et al. | 280/236 |
| 3,919,891 | 11/1975 | Stuhlmuller et al. | 192/142 R |
| 3,926,020 | 12/1975 | Dantowitz et al. | 280/238 X |
| 3,929,025 | 12/1975 | Perry . | |
| 4,041,788 | 8/1977 | Nininger, Jr. . | |
| 4,352,503 | 10/1982 | Cotter | 280/238 |
| 4,421,336 | 12/1983 | Petrofsky | 74/105 X |
| 4,456,277 | 6/1984 | Carpenter | 280/269 X |
| 4,490,127 | 12/1984 | Matsumoto et al. | 474/110 |
| 4,571,219 | 2/1986 | Breden et al. | 474/70 |
| 4,599,079 | 7/1986 | Chappell | 474/80 |
| 4,605,240 | 8/1986 | Clem et al. | 280/236 |
| 4,701,152 | 10/1987 | Dutil et al. | 474/70 |
| 4,708,356 | 11/1987 | Levavi | 74/42 X |
| 4,713,042 | 12/1987 | Imhoff | 474/69 |
| 4,779,863 | 10/1988 | Yang | 280/258 X |
| 4,826,190 | 5/1989 | Hartmann | 280/259 X |
| 4,875,699 | 10/1989 | Levavi | 74/523 X |
| 5,033,991 | 7/1991 | McLaren | 474/78 |
| 5,059,158 | 10/1991 | Bellio et al. | 474/70 |
| 5,213,548 | 5/1993 | Colbert et al. | 474/81 X |
| 5,328,195 | 7/1994 | Sommer et al. | 280/233 |
| 5,356,349 | 10/1984 | Browning | 474/78 |
| 5,407,396 | 4/1995 | Gilbert | 474/80 |
| 5,439,240 | 8/1995 | Tichenor et al. | 280/253 X |

*Primary Examiner*—Roger J. Schoeppel
*Attorney, Agent, or Firm*—Reising, Ethington, Barnard & Perry

[57] ABSTRACT

An automatic speed range shifter for bicycles is disclosed which produces a downshift when a predetermined pedal force is exceeded and which produces an upshift when a predetermined pedal rotational speed is exceeded. A pedal force sensor comprises a strain gage element on an arm supporting an idler sprocket for the chain. A pedal rotational speed sensor comprises a magnet/coil coacting with the pedal crank. A microcomputer receives inputs from the force and speed sensors and produces control signals for the automatic shifter. The automatic shifter comprises a front shifter actuator including a reversible electrical servo motor which is coupled by a cable with the front derailleur. It also comprises a rear shifter actuator with a reversible servo motor which is coupled by a cable with the rear derailleur.

6 Claims, 6 Drawing Sheets

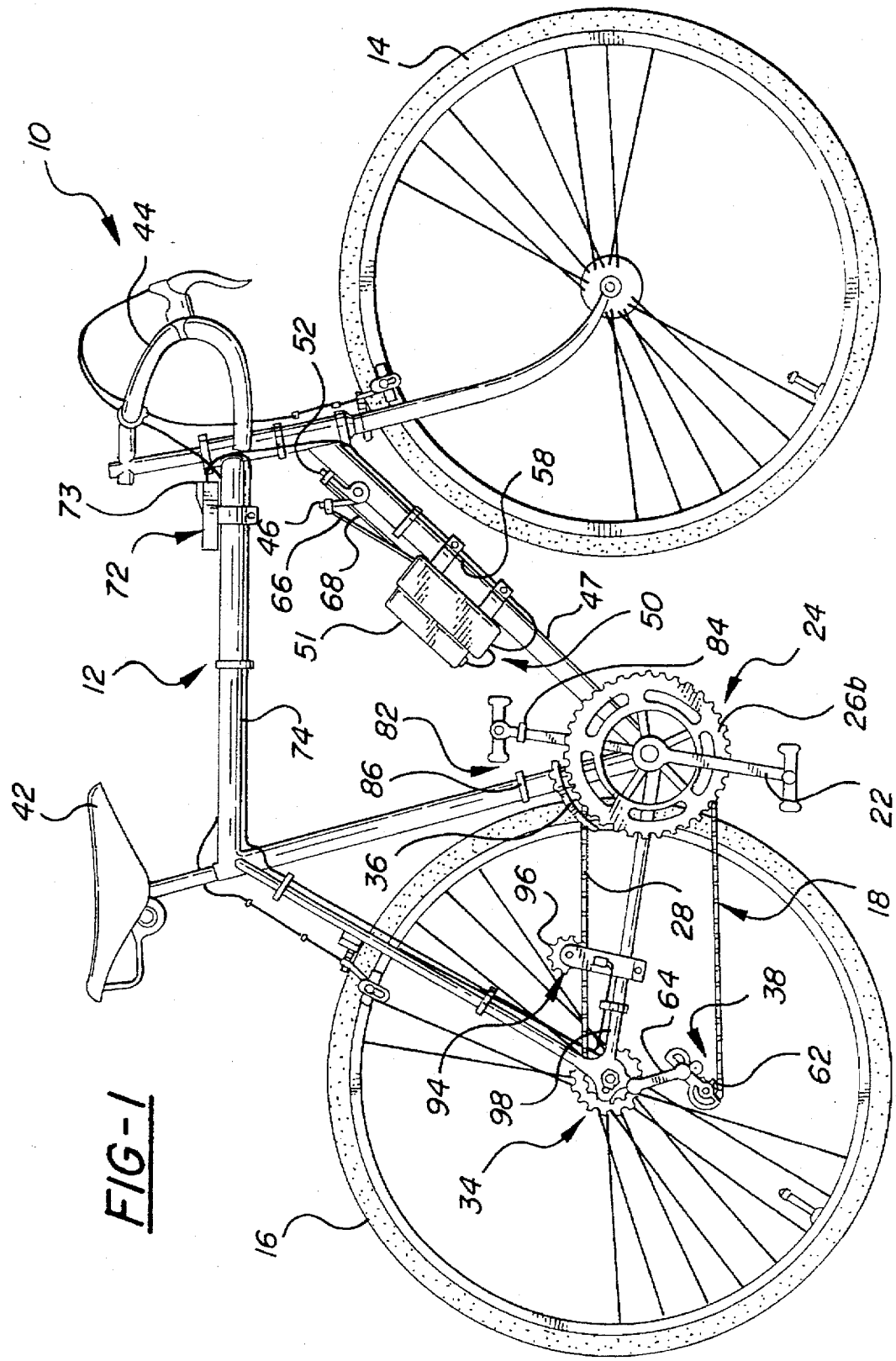

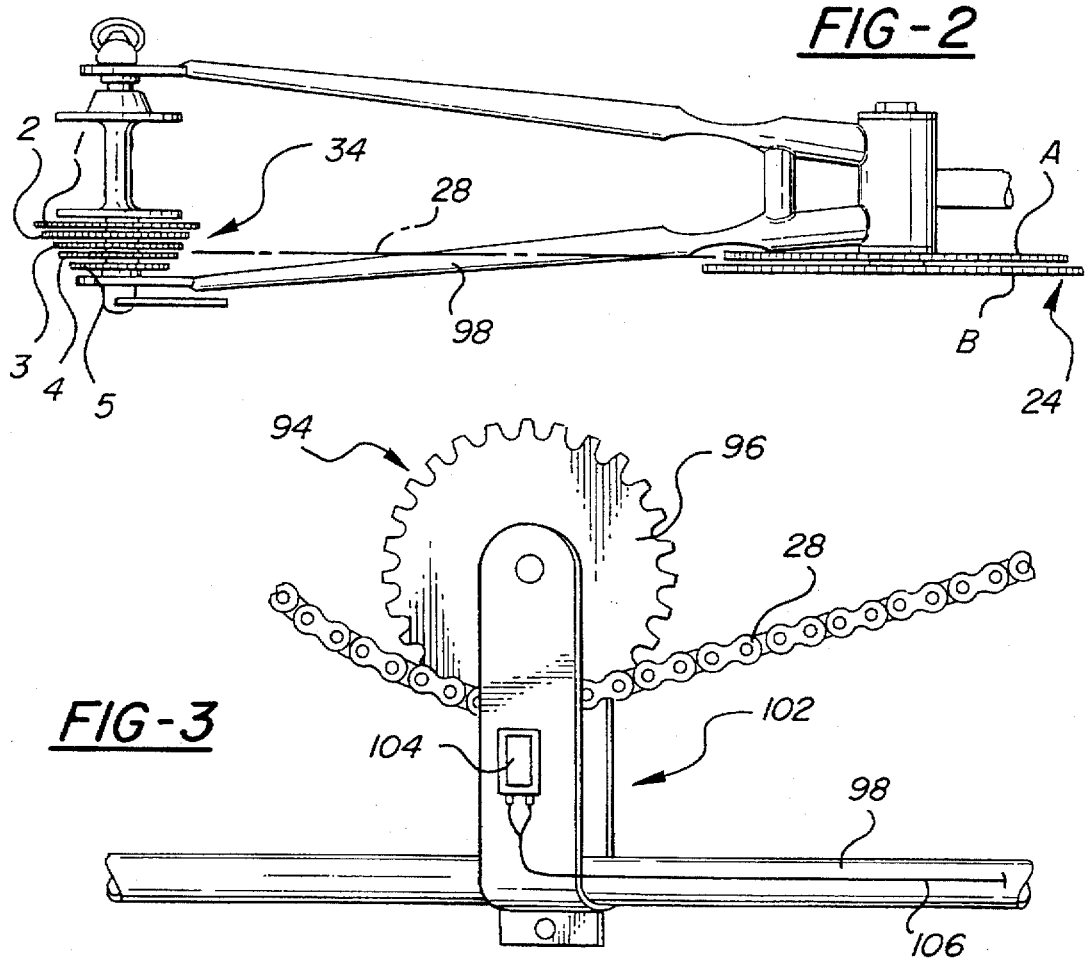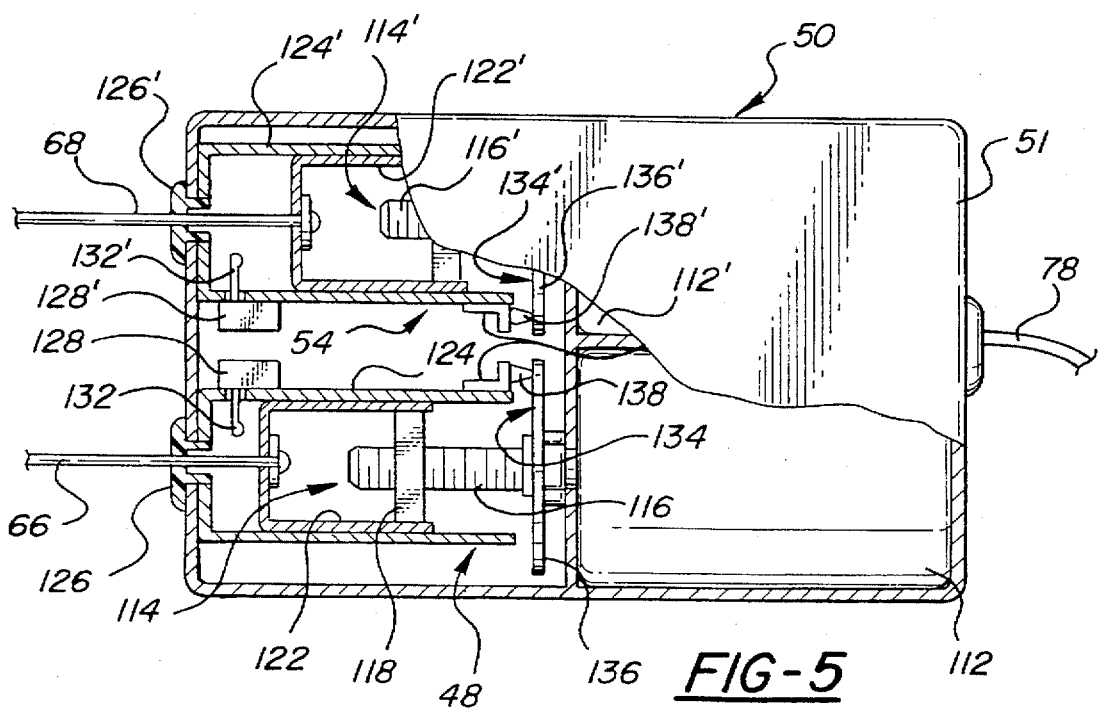

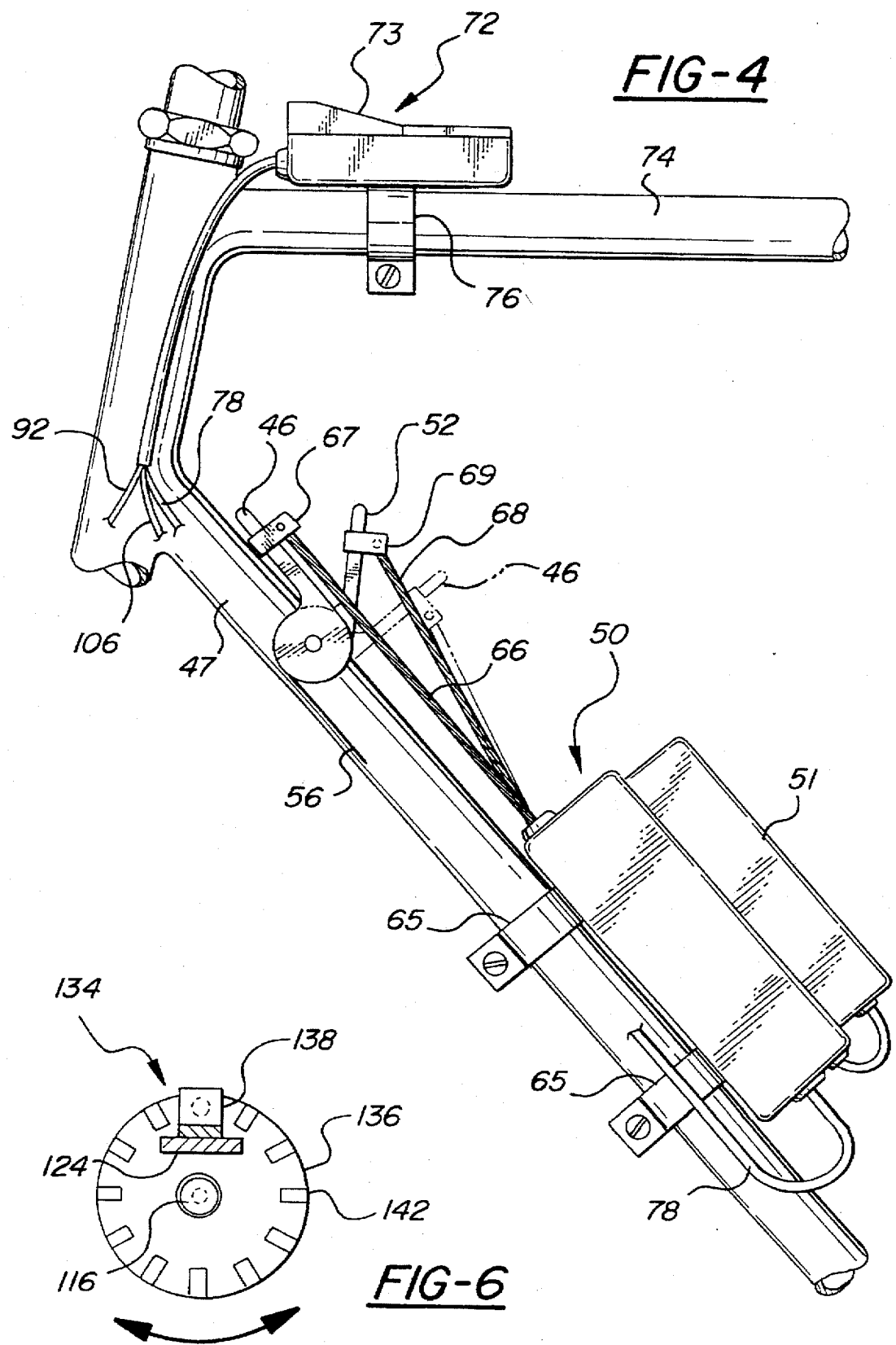

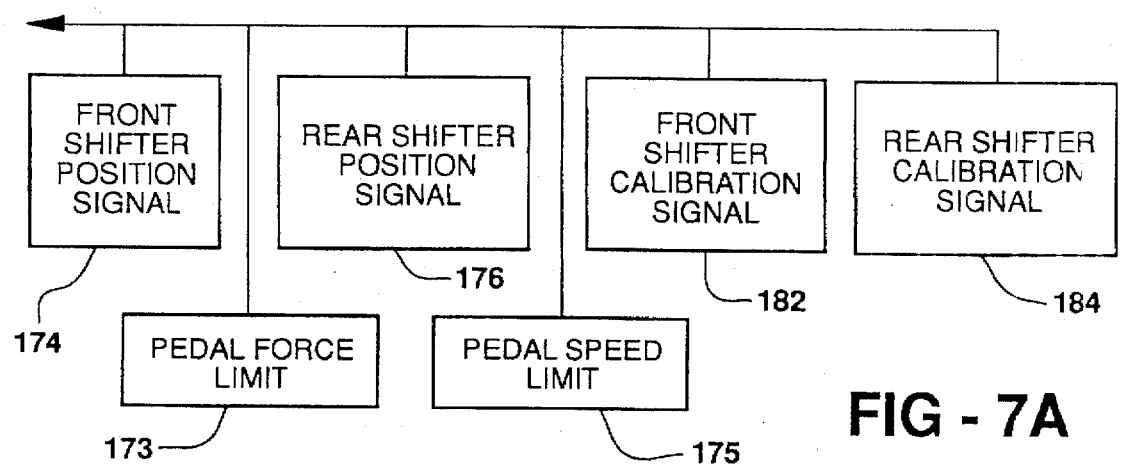
FIG - 7A
FIG - 8
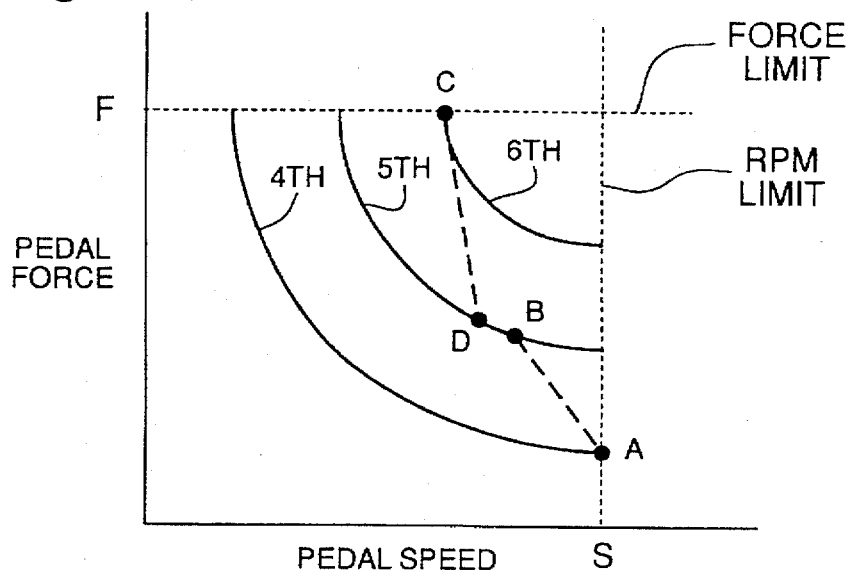
FIG - 11
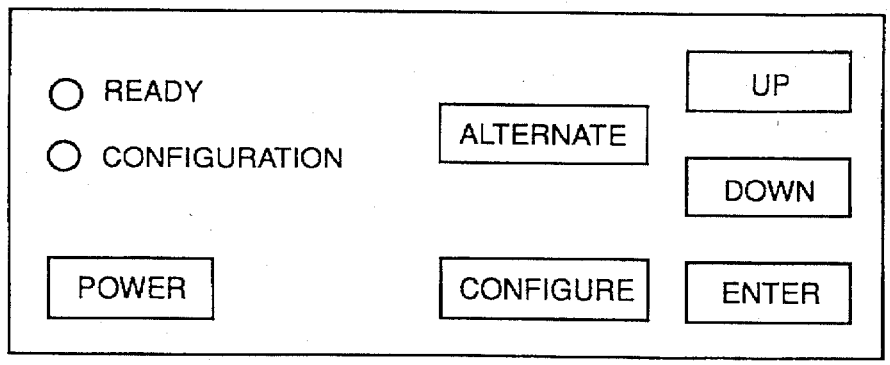

AUTOMATIC TRANSMISSION SHIFTER FOR VELOCIPEDES

This application is a division of application Ser. No. 08/514,657, U.S. Pat. No. 5,599,244.

FIELD OF THE INVENTION

This invention relates to power transmissions for vehicles; more particularly, it relates to automatic ratio-changing power transmissions for bicycles and other velocipedes.

BACKGROUND OF THE INVENTION

For many years it has been a common practice of bicycle manufacturers to provide, as original equipment, ratio-changing power transmissions in the power train between the pedal crank and the traction wheel of the bicycle. The power train of most currently manufactured bicycles comprises a chain and sprocket drive between the pedal crank and the traction wheel. As used herein, the gear ratio of the transmission is the ratio of the diameter of the drive sprocket on the pedal crank to the diameter of the driven sprocket on the traction wheel and produces a speed ratio of the same value between the drive and driven sprockets. In bicycle parlance, the lowest speed ratio, i.e. lowest speed range, is called "first speed" (or "first gear") and higher ratios are called "second speed", "third speed", etc. A bicycle provided with a transmission having three different speed ratios is referred to as a three speed bicycle, one having ten different ratios is referred to as a ten speed bicycle and so on. Bicycles are commonly provided with three speed, ten speed, fifteen speed and twenty speed transmissions. A three speed bicycle usually has a barrel (or drum) power transmission in which the ratio changing mechanism is contained within the hub of the rear traction wheel. For five speed bicycles and those having a higher number of speeds, the different speed ratios are provided by one or more sprocket wheels (herein called "sprockets") on the pedal crank ("pedal sprockets") and a plurality of different size sprockets on the traction wheel ("wheel sprockets"), the pedal sprockets and wheel sprockets being coupled by an endless chain. The ratio changing is accomplished by a mechanism called a derailleur which controllably shifts the chain from engagement with one sprocket to another. A manually actuated shifter lever, usually mounted on the front part of the down tube or top tube of the bicycle frame, is connected by a cable to the derailleur. In the case of a five speed bicycle, it is usual practice to provide a single pedal sprocket and five different wheel sprockets and a rear derailleur for shift control. For a ten speed bicycle, there are two pedal sprockets and five wheel sprockets with both a pedal sprocket derailleur and a wheel sprocket derailleur, thus providing ten different sprocket combinations.

In the conventional bicycle transmission shifter, the pedal sprocket derailleur comprises a laterally movable chain cage which urges the chain into alignment with a selected one of the sprockets at the pedal crank. The wheel sprocket derailleur comprises a guide sprocket and tensioning sprocket which successively engage the chain in its slack portion (as distinguished from its driving portion) between the pedal sprocket and the wheel sprocket. The wheel sprockets are axially aligned and laterally displaced from each other with progressively larger diameters from the outboard to the inboard sprocket. The derailleur is provided with a cable operated transfer lever, typically a spring-loaded bell-crank lever, which shifts the guide sprocket laterally so that it can be aligned with any one of the wheel sprockets.

Although the conventional derailleur leaves much to be desired, it is the predominant type of bicycle shifter mechanism. Shifting by the rear derailleur is accomplished by repositioning the selector lever during pedalling to move the guide sprocket, and hence the chain, in either inboard or outboard direction to the adjacent sprocket. This lateral movement of the guide sprocket leads the chain from meshing engagement with one sprocket to a position in which it picks up a tooth of the adjacent sprocket and becomes meshed therewith. The shifting is controlled by the rider mostly by the feel of the selector lever and the resultant interaction of the chain and sprocket, rather than by visual positioning of the lever.

For the skilled rider on a familiar bicycle with a well adjusted derailleur, manual shifting usually results in a smooth transition from one speed to another. For a rider of lesser skill, especially with an unfamiliar bicycle and a poorly adjusted derailleur, shifting may result in a rough transition with uncertain timing. Manipulation of the shifter lever is a distraction to the rider, usually for an undue period of time, and may result in an unsafe operating condition. The shifting of a three speed or five speed bicycle through successively higher or lower speed ranges calls only for a simple easily understood progressive position changes of the selector lever. However, for a bicycle which has two derailleurs, such as a ten speed, the typical pattern for the two selector levers is not a simple progressive positioning pattern to obtain successively higher or lower speed ranges; instead, it is a complex shift pattern which the rider must memorize in order to select a desired speed range.

In the field of bicycling, there has been a long-standing need for replacing or supplementing the manual shifter with an automatic shifter to relieve the rider from the need for manual shifting. While the required technology, in terms of mechanics and electronics, has long been available for an automatic shifter and while there have been many inventions and proposals, none has met with any significant success.

The prior art systems are unduly complex and too costly to manufacture. They require replacement or modification of conventional component parts and are not adapted for installation on a conventional bicycle. In the prior art systems, the criteria for shifting leaves much to be desired in meeting the needs of an individual rider in producing a timely upshift or downshift with quick and smooth shifting. Further, the prior art is lacking in respect to providing highly efficient bicycle operation while also providing minimized physical and mental demands on the rider.

In the prior art, it has been known for several years to provide an automatic shifter for bicycles wherein a derailleur is actuated by an electric motor under the control of a microcomputer in response to rotational speed of a bicycle wheel and/or rotational speed of the crank gear. Such an automatic shifter is described in Matsumoto et al U.S. Pat. No. 4,490,127 granted Dec. 25, 1984. In the system of this patent, a microcomputer with a stored program derives 1) optimum running speed ranges and 2) crank gear rotation speed ranges which correspond respectively to the five transmission gears. A proper speed range is defined as that which enables the rider to ride the bicycle at maximum efficiency while being subjected to the least fatigue, taking into account the rider and various driving conditions. In the system of this patent, the transmission is shifted by a cable wound on a motor driven take-up reel and connected with the derailleur. A rotary decoder driven by the take-up reel shaft detects which transmission gear has been selected. A wheel speed sensor develops a bicycle speed signal which is supplied to the microcomputer and a crank gear rotation sensor develops a signal corresponding to the crank gear speed which is supplied to the microcomputer. The proper speed range for each transmission gear is defined between upper and lower limits which are expressed in terms of constants supplied by setting switches. Information regarding the rider and topography, along with the condition setting switches is supplied to the microcomputer. In operation under the control of the computer program, the running speed of the bicycle is compared with the proper speed range for the selected transmission gear. When the running speed is greater than the maximum speed in the proper speed range, an upshift signal causes the motor actuator to select the next higher speed range. Conversely when the actual speed is lower than the minimum speed of the proper speed range, a downshift signal is produced to select the next lower transmission gear so that the actual running speed is in the proper speed range. Also, the system of this patent includes a process for defining a crank gear rotation speed range to allow the crank gear to rotate substantially at constant speed for each transmission gear. For this, upper and lower limits for the crank gear speed are established to define a speed range for each of the five transmission gears. These limits are established by assigning constants for each of the speed ranges by the use of condition setting switches. These constants are initial values which are modified or compensated by a constant dependent upon the individual bicycle rider and the riding conditions. When the crank gear rotational speed key switch is depressed, the actual speed of rotation of the crank gear is compared with the proper speed range for the selected transmission gear. When the actual speed is higher than the maximum speed of the range, an upshift signal is generated to upshift the transmission so that crank speed is within the speed range of the selected gear. Conversely, when the actual speed is less than the minimum speed of the speed range, a downshift signal is generated to downshift the transmission so that the actual speed is within the speed range of the selected gear.

Another electronically controlled bicycle transmission is described in the Clem et al U.S. Pat. No. 4,605,240 granted Aug. 12, 1986. In the system of this patent, a microcomputer receives inputs from a bicycle speed detector, a plurality of manually controlled switches and a feedback signal from an actuator for the derailleur. The actuator is controlled by the microcomputer and positions the derailleur for gear selection in accordance with bicycle speed.

An automatic transmission for a multi-speed bicycle is also described in the Dutil et al U.S. Pat. No. 4,701,152 granted Oct. 20, 1987. The system of this patent shifts the axial position of the derailleur automatically in response to the speed of the bicycle wheel which is sensed by centrifugal fly weights on the wheel. Other prior art patents which describe automatic shifters for bicycles which effect shifting in response to bicycle speed are as follows: Gardel et al U.S. Pat. No. 3,830,521 granted Aug. 20, 1974 describes an automatic shifter which uses a fly weight governor for shifting the transmission in response to bicycle speed. The Stuhlmuller et al U.S. Pat. No. 3,919,891 granted Nov. 18, 1975 discloses a shifter which has an electrical actuator with manual switching for speed range selection and is provided with a speed responsive inhibiting arrangement to prevent shifting until a certain speed is reached. The Dantowitz U.S. Pat. No. 3,926,020 granted Dec. 16, 1975 discloses a bicycle transmission with a belt drive and variable diameter pulley with a hydraulic actuator controlled by a fluid pressure speed signal corresponding to pedal speed.

It is also known in the prior art to provide an automatic shifter for a bicycle in which the ratio is changed in response to the value of torque applied to the power train of the bicycle. The McGuire U.S. Pat. No. 3,769,848 granted Nov. 6, 1973 discloses an automatic shifter having a set of sprockets on the rear wheel which is laterally shiftable, in response to torque, to change the engagement of the chain from one sprocket to another. In this device, a cam track is provided on a shaft which supports the hub and sprockets for axial movement; a cam follower is carried by the hub so as to move the hub axially against a spring as the torque on the hub increases. The hub is moved axially in the opposite direction by the spring as the torque decreases.

In the Perry U.S. Pat. No. 3,929,025 granted Dec. 30, 1975, a mechanical linkage arrangement is provided for actuating a derailleur in response to changes of chain tension resulting from variations in pedal pressure. In the device of this patent a control arm is pivotally mounted on the frame and connected with the derailleur by a cable. An idler sprocket, which is mounted on the control arm in engagement with the chain, causes rotation of the control arm in one direction with increasing chain tension. The control arm is rotated in the opposite direction by a spring in response to decreasing chain tension. The control arm is in equilibrium for a predetermined chain tension in each of the multiple positions of the arm. When the actual chain tension is different from the predetermined tension, the control arm rotates in a direction to eliminate the difference and shifts the derailleur to a different speed range.

Also, in the prior art, it has been proposed to provide an automatic shifter for bicycles which is actuated in response to bicycle speed at a speed value which is modified by the driving torque applied to the traction wheel. Such a device is described in the Imhoff U.S. Pat. No. 4,713,042 granted Dec. 15, 1987. In the device of this patent, a shifter sleeve carries a set of sprockets and is axially slidable in the hub of the traction wheel. A set of fly weights produces a shifting force to move the shifter sleeve against a bias spring in one direction in response to increasing speed to change the chain engagement from one sprocket to another. It is moved in the other direction by the bias spring in response to decreasing speed. The shifter sleeve is drivingly engaged with the hub of the traction wheel by a cam slot in the hub and a cam follower on the sleeve. Increasing torque on the shifter sleeve produces an increasing resistance to the movement of the shifter sleeve in the axial direction and thus modifies the value of speed at which the chain is shifted from one sprocket to another.

A general object of this invention is to provide an improved automatic shifter for velocipedes, especially bicycles, and to overcome certain disadvantages of the prior art.

SUMMARY OF THE INVENTION

In accordance with this invention, an automatic speed range shifter and method of operation for bicycles and other velocipedes is provided which achieves highly efficient operation of the bicycle with a minimum of physical and mental demands on the rider. This is accomplished by using predetermined shift-point criteria and a predetermined shift pattern both of which may be established for the particular bicycle, the individual rider and even for the characteristics of the trip to be undertaken.

Further, the criteria for upshifting and downshifting is such that the need for shifting is determined at the earliest perceptible time—substantially before the rider would sense it from physical reaction. This enables the required shift to be initiated before the rider experiences the usual amount of the fatiguing effect from a bike with a manual shifter which is held in the wrong speed range until the rider senses enough physical discomfort to motivate the rider to initiate a shift. This is accomplished by measuring the pedal crank speed, producing a first control signal when the average value of the pedal crank speed increases to a predetermined value and initiating an upshift in response to the first control signal and by measuring the pedal force, producing a second control signal when the average value of the pedal force increases to a predetermined value and initiating a downshift in response to the second control signal.

Further, the automatic shifter of this invention is adapted for programming of the upshifts and downshifts in a desired sequence of speed ranges to establish a shift pattern.

Further, the invention is adapted for use on bikes having different numbers of speed ranges and to utilize all or less than all speed ranges in the shift pattern.

Further, an automatic shifter is provided which is adapted for installation on a bicycle or other velocipede either as a factory installation or a retrofit installation. It is of simple construction, low cost and is highly reliable in operation. It is adapted for use with any conventional ratio-changing transmission and is especially well-adapted for use with a conventional derailleur. Further, the invention requires a minimum number of mechanical and electronic components which do not adversely affect or interfere with the velocipede.

Further, the automatic shifter of this invention permits operation of the velocipede in such manner that the rider is not required to rotate the pedal crank faster than a certain RPM or to apply a pedal force greater than a desired value. The automatic shifter may be readily set to adapt it to the physical characteristics of a particular rider and to adapt it for operation on different types of terrain. Further, the shifter of this invention operates with shift points between adjacent speed ranges which are determined as a function of either pedal crank speed or pedal force.

Further, in accordance with this invention, an automatic speed range shifter is provided which comprises speed sensing means for generating an electrical signal corresponding to the rotational speed of the pedal crank, force sensing means for generating an electrical force signal corresponding to the force applied to the pedal crank, a servo motor for actuating a control member of the speed ratio-changing transmission, and a microcomputer for controlling the servo motor in accordance with the speed signal and force signal. The microcomputer is operative to energize the servo motor to upshift the transmission in response to the speed signal exceeding a predetermined value and to downshift in response to said force signal exceeding a predetermined value.

Further, in accordance with this invention, unwanted shifting is prevented by inhibiting energization of the servo motor until the time average value of the pedal speed or pedal force reaches a predetermined value during a predetermined time.

Further, in accordance with this invention, the microcomputer is operative to produce an upshift or a downshift signal when the rate of change of speed or the rate of change of force exceeds respective predetermined threshold values.

A complete understanding of this invention may be obtained from the detailed description that follows taken with the accompanying drawings.

DESCRIPTION OF THE DRAWINGS

FIG. 1 is a side elevation view of a bicycle provided with an automatic shifter in accordance with this invention;

FIG. 2 is a plan view of the chain drive of the bicycle of FIG. 1;

FIG. 3 is a side elevation view of a chain force sensor;

FIG. 4 is a side elevation view of the power actuator of the automatic shifter as installed on the bicycle of FIG. 1;

FIG. 5 is a plan view, partially in section, of the power actuator;

FIG. 6 shows a detail of the power actuator;

FIG. 7A is a block diagram depicting the storage of certain data in the memory of the controller;

FIG. 8 is a graphical representation of operation of the bicycle at constant power to aid the explanation of the invention;

FIG. 11 shows a control panel of the automatic shifter for data input by the rider and for display of information to the rider.

BEST MODE FOR CARRYING OUT THE INVENTION

Figure 7:
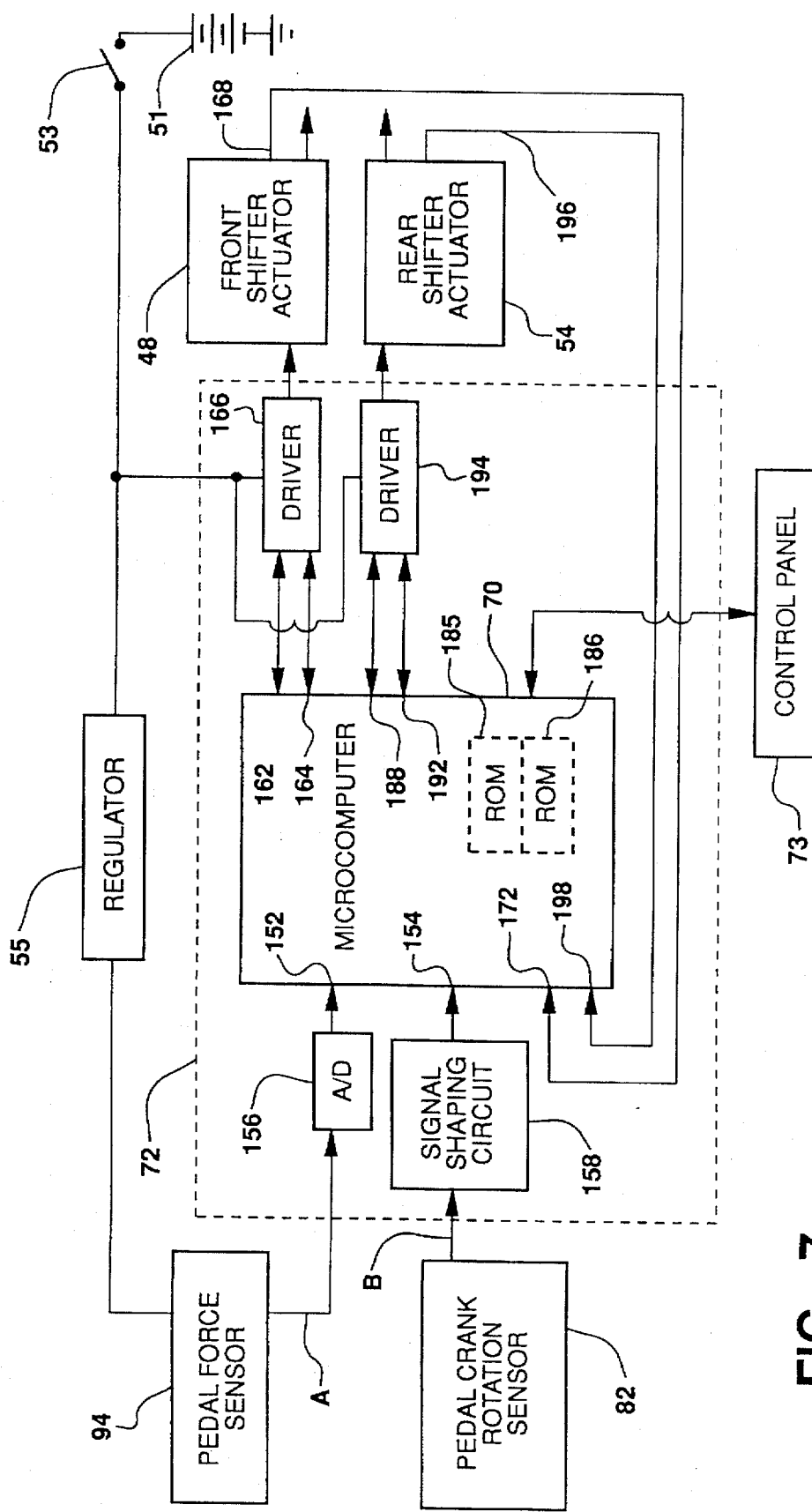
FIG. 7 is a block diagram of the automatic shifter.

Referring now to the drawings, there is shown an illustrative embodiment of the invention which is adapted for a bicycle having a chain drive with a ratio-changing derailleur transmission for transmitting power in a selected one of a plurality of speed ranges. The illustrative embodiment of the invention provides an automatic shifter for a ten speed bicycle. It will be appreciated, as the description proceeds, that the invention is useful in a wide variety of applications and may be implemented in many different ways.

Manual Gear Shifter of a Typical Bicycle

Before describing the automatic shifter of this invention, a typical bicycle power train and manual shifter will be described with reference to a bicycle as shown in FIGS. 1 through 4. The bicycle 10 is a ten speed bicycle, i.e. it has ten different speed ratios or ranges provided by a power transmission which is of conventional design. The bicycle 10 comprises, in general, a frame 12 mounted on a steerable front wheel 14 and a rear traction wheel 16. The bicycle has a power train 18 including a pedal crank 22 which rotatably drives a front sprocket set 24 which includes a pair of front drive sprockets A and B and a drive chain 28 which is engagable with either of the front sprockets. As shown in FIGS. 1 and 2, the power train also comprises a rear sprocket set 34 including five different driven sprockets 1, 2, 3, 4 and 5, all of which are coupled to the hub of traction wheel 16 through an overrunning clutch (not shown) to provide unidirectional power transmission and to allow free wheeling in a conventional manner. A front shifter, i.e. front derailleur 36, is provided to move the drive chain from engagement with one to the other of the front sprockets A and B. A rear shifter, i.e. rear derailleur 38, is provided to move the drive chain from engagement with one rear sprocket to another one of the rear sprockets 1, 2, 3, 4 and 5. The front and rear sprocket sets 24 and 34 and the drive chain 28 constitute a changeable ratio transmission in the power train 18 between the pedal crank 22 and the traction wheel 16. The bicycle rider typically operates the bicycle from a seated position on the seat 42 by supplying motive power input to the power train by pedalling action on the pedal crank 22 while steering the bicycle with a pair of handlebars 44.

As is well-known, ten different speed ranges may be obtained from this ratio-changing transmission. A first speed range is provided with the chain engaging the smaller front sprocket and the largest rear sprocket and the tenth speed range may be provided with the larger front sprocket driving the smallest rear sprocket. The speed ranges two through nine are obtained from different combinations of front and rear sprockets. A shift pattern to upshift from first speed to tenth speed in succession requires shifting more than once between the two front sprockets with a shifting sequence for the rear sprockets which includes several shifts from a larger to a smaller sprocket and vice versa.

Without the automatic shifter of this invention, the front derailleur 36 is actuated by the conventional manual shift lever 46 which is mounted on the down tube 47. The front derailleur 36 is connected to the shift lever 46 by a tension cable 56 (see FIG. 4). When the lever 46 is pivoted rearwardly, the cable pulls the chain guide of the derailleur to the right and puts the chain on the outboard sprocket B. The front derailleur 36 includes a return spring (not shown) which moves the guide member of the derailleur to the left when the shift lever 46 is returned to the forward position and moves the chain to the inboard sprocket A. The rear derailleur 38 is actuated by the manual shift lever 52. The shift lever 52 is connected by a cable 58 to the rear derailleur 38. The rear derailleur comprises a spring loaded chain tensioning sprocket 62, which takes up chain slack, and a guide sprocket 64 for guiding the chain in a lateral motion for alignment with a selected one of the driven sprockets. When the shift lever 52 is pivoted rearwardly from its forwardmost position, the tension on the cable 58 pulls the guide sprocket 64 from an outboard position toward an inboard position to successively align the chain with the different driven sprockets in the rear sprocket set 34. The rear derailleur is provided with a return spring (not shown) which tends to move the guide sprocket 64 in the reverse direction when the shift lever 52 is moved forwardly from a rearward position. The shift lever 52 controls the several gear positions, i.e., chain engagement with any one of the sprockets in the sprocket set 34.

In manual gear shifting, changing of gear positions by repositioning shift lever 46 or 52 is felt by the rider and typically there is no visual gage or tactile signal for indication of lever position or speed range. Because of the feel of gear changing the rider can watch the road while shifting. However, in order for the rider to know which speed range is selected the rider must keep track of the changes made from a starting speed range and must mentally correlate the changes with the shift pattern.

General Description of the Automatic Shifter

As shown in FIG. 1, The automatic shifter of this invention comprises, in general, a power unit 50 for actuating the derailleurs, an electronic programmable controller 72 for controlling the power unit, a pedal crank rotation sensor 82 and a pedal force sensor 94 which provide pedal speed and pedal torque information to the controller. These components of the automatic shifter will be described in detail subsequently.

The power unit 50 comprises front shifter and rear shifter power actuators 48 and 54 which are mounted side-by-side in a single housing (See FIG. 5) on the down tube 47 of the bicycle frame by clamp bands 65 around the tube, as shown in FIG. 4. The power actuator 48 is connected with the front shift lever 46 by a cable 66 and a disconnectable connector 67 and the power actuator 54 is connected with the rear shift lever 52 by a cable 68 and a disconnectable connector 69.

The electronic programmable controller 72 is mounted on the top tube 74 of the bicycle frame by a clamp band 76. The controller 72 is coupled with the power actuators 48 and 54 by an electrical cable 78 for energizing the motors under control of the controller. The controller 72 includes a control panel 73 which serves as a user interface for the bicycle rider. A battery 51 (see FIG. 4) for supplying the electrical power required by the automatic shifter is provided in a battery compartment 51' which is removably mounted on the housing of the power unit 50. The automatic shifter is powered up by a manual power switch 53 on the control panel.

For the purpose of developing pedal crank speed information, a pedal crank rotation sensor 82 is provided. It comprises a magnet 84 mounted on one of the pedal crank arms and a pick-up coil 86 mounted on the seat-tube of the bicycle opposite the magnet. A voltage pulse is developed by the pick-up coil 86 each time the magnet 84 rotates past the coil. This produces a pulse train, referred to herein as the pedal crank rotation signal, and it is transmitted to the electronic controller 72 by a signal cable 92 for developing a pedal crank speed signal.

For the purpose of developing a torque signal corresponding to the value of force applied by the rider to the pedal crank 22, the chain force sensor 94 is provided (See FIG. 3). The chain force sensor comprises an idler sprocket 96 which is rotatably mounted on the chain-stay 98 by a tension bracket 102. The tension bracket 102 is provided with a strain gage transducer 104. The strain gage transducer exhibits an electrical resistance corresponding to the amount of force on the chain 28 and is coupled to the controller 72 by a signal cable 106 for developing a pedal force signal.

The Power Actuator

The power unit 50 which comprises first and second actuators 48 and 54, respectively, will now be described in detail with reference to FIGS. 4, 5 and 6. The shift levers 46 and 52 for the front and rear derailleurs, respectively, as shown in FIG. 4, remain connected as described above for manual operation. This is a preferred arrangement, especially in a retrofit of the automatic shifter to an existing bicycle because only a minimum of change is required for installation. Further the manual shifters can be used in lieu of the automatic shifter of this invention in case the automatic shifter is not in service for some reason.

Referring now to FIG. 5, the power actuator 48 comprises a reversible rotary electric servo motor 112 and a motion converter 114 for converting the rotary motion of the servo motor 112 to linear motion. The output shaft of the servo motor 112 comprises a lead screw 116 which threadedly engages a travelling nut 118. The nut 118 is non-rotatably mounted in a U-shaped slide 122 which is slidably mounted within a fixed U-shaped guide 124 which is fixedly mounted to the housing of the power unit 50. The tension cable 66 is attached at its inner end to the crosspiece of the U-shaped slide 122 and it extends through a grommet 126 in the end wall of the housing 50. When the servo motor 112 is rotated in the clockwise direction (as viewed from the shaft end), the slide 122 is retracted toward the servo motor and the cable 66 is also retracted. When the rotation is reversed, the slide 122 and the cable 66 are extended. For the purpose of detecting when the slide 122 is in a reference or home position, a micro switch 128 is mounted on the guide 124 with the switch actuator 132 located for engagement and actuation by the slide 122 when it reaches the home position. For the purpose of determining the position of the slide 122, and hence the inner end of cable 66, a rotary encoder 134 is provided. As shown in FIG. 6, the encoder comprises an encoder disk 136 which is mounted on the shaft 116 for rotation therewith. The encoder also comprises a fixed electrical contact 138 which is mounted on the guide 124. The encoder disk 136 comprises a circular plate of non-conductive material provided with multiple electrical contacts 142 which are equally spaced around the periphery of the disk for engagement by the contact 138. The electrical contacts 142, suitably ten in number, are individually electrically connected to the shaft 116 by conductors not shown and thence to the electrical chassis ground of the electronic controller 72. Thus, a shifter position signal is produced from the electrical pulses generated by the encoder 134 and the home position pulse generated by the microswitch 128. This position signal is obtained by counting the net number of pulses generated by the encoder, starting with the slide 122 in its reference position; i.e., by incrementing a counter for each pulse generated by motor rotation in the slide retracting direction and decrementing the counter for each pulse generated by the opposite rotation.

The power actuator 54 is of the same construction as that just described for power actuator 48. The corresponding parts of actuators 54 and 48 are identified by the same reference characters except that a prime symbol is added to the reference characters applied to actuator 54.

The Electronic Control System

The electronic control system of the automatic shifter of this invention will be described in further detail with reference to FIGS. 7 and 7A. The electronic control system comprises, in general, the electronic controller 72, the pedal force sensor 94, the pedal crank rotation sensor 82 and the front and rear shifter actuators 48 and 54. Power is supplied to certain components of the controller through a voltage regulator 55 and to other components directly from the battery, as indicated.

The controller 72 comprises a microcomputer 70 for operation of the automatic shifter in accordance with certain algorithms implemented in a control program which will be described subsequently. The microcomputer of the controller 72 includes a read only memory (ROM) 185 which stores the control program and a ROM 186 which stores a shift signal pattern, suitably as a look-up table. It also includes a read/write random access memory (RAM) which accommodates certain variable data storage including front and rear shifter position signal stores 174 and 176 and front and rear shifter calibration signal stores 182 and 184. In general, the controller 72 receives certain input signals including a pedal force signal on input 152 and a pedal crank speed signal on input 154.

The pedal force signal is generated by the force sensor 94 which comprises the strain gauge transducer 104, as described above with reference to FIG. 3. The transducer is connected in a resistive network to generate an analog voltage which varies with the tension in the chain 28 which corresponds to the pedal force applied by the bicycle rider. The pedal force sensor signal is applied to the input of an analogue to digital (A/D) converter 156 to develop a digital pedal force signal corresponding to the instantaneous value of pedal force. This digital signal is applied to the input 152 of the microcomputer 70 for further processing.

The pedal crank rotation sensor 82, as described above with reference to FIG. 1 produces a voltage pulse train having a frequency corresponding to the rotational speed of the pedal crank. This rotation signal is applied to the input of a signal shaping circuit 158. The circuit 158 produces a digital output signal comprising a rectangular pulse train corresponding to the pulse train from the rotation sensor 82. The output of the signal shaping circuit 158 is applied to the input 154 of the microcomputer 70 for further processing.

The microcomputer 70 operates under software control to process the pedal force signal at input 152 to produce a pedal force signal which is representative of the instantaneous value of force applied to the pedal by the rider. It also produces a force rate of change signal corresponding to the time rate of change of the pedal force signal. Likewise, the microcomputer 70 operates to process the digital pedal crank rotation signal at input 154 for producing a pedal crank speed signal which is representative of the instantaneous value of the pedal speed. It also produces a rotation rate of change signal corresponding to the time rate of change of the pedal crank speed. The microcomputer 70 operates under control of the stored control program and is responsive to the aforementioned signals and certain predetermined parameter values stored in the computer memory and generates control signals for the energization of the power actuators 48 and 54.

The microcomputer 70 develops front shifter control signals on outputs 162 and 164 for controlling the power actuator 48 for front derailleur 36. The outputs 162 and 164 are coupled to the inputs of a driver circuit 166 which controls the energization of the actuator 48. The front shifter control signals include a retract signal for retraction of the slide 122 (toward larger sprocket), an extend signal for extension of the slide 122 (toward smaller sprocket) and standstill signal for holding the slide 122 in position. These control signals at outputs 162 and 164 have a first logic state of 10 for the retract signal, a second logic state of 01 for the extend signal and a third logic state of 00 for the standstill signal.

The front shifter actuator 48 under control of the controller 72 responds to a retract or an extend signal, as the case may be, by moving the slide 122 to the position for chain alignment with either the small front sprocket A or large front sprocket B and then waiting for another control signal. For this purpose, the encoder signal developed by the encoder 134 at output 168 of the actuator 48 is applied to input 172 of the microcomputer. The encoder signal pulses are counted by the microcomputer in an up/down counter and the net count, starting from the reference position, is stored in the front shifter position signal store 174. This stored signal represents the actual position of the slide 122 of the front shifter actuator 48. The shifter calibration store 182 stores the shifter calibration signals which represent the two positions of slide 122 for chain engagement respectively with the small front sprocket A and large front sprocket B. The front shifter position signal in store 174 is compared with the shifter calibration signal stored in store 176 and when they are equal, both of the outputs 162 and 164 go to logic 0 thus representing a standstill signal 00 and the servomotor of actuator 48 is deenergized. The actuator remains deenergized and holds the slide 122 in fixed position until it receives a control signal for either retraction or extension of the slide. The next control signal will be produced at outputs 162 and 164 as an extend, retract or standstill signal in accordance with the need for shifting.

The controller 72 develops rear shifter control signals on outputs 188 and 192 for controlling the power actuator 54 for rear derailleur 38. The outputs 188 and 192 are coupled to the inputs of a driver circuit 194 which controls the energization of the rear shifter actuator 54. The rear shifter control signals includes a retract signal for retraction of the slide 122', an extend signal for extension of the slide 122' and standstill signal for holding the slide 122' in position. These control signals at outputs 188 and 192 have a first logic state of 10 for the retract signal, a second logic state of 01 for the extend signal, and a third logic state of 00 for the standstill signal.

The rear shifter actuator 54 under control of the controller 72 responds to a retract or an extend signal, as the case may be, by moving the slide 122' to the position for chain alignment with either a smaller or larger rear sprocket and then waiting for another control signal. For this purpose, the encoder signal developed by the encoder 134' at output 196 of the actuator 54 is applied to input 198 of the microcomputer. The encoder signal pulses are counted by the microcomputer in an up/down counter and the net count, starting from the reference position, is stored in the rear shifter position signal store 176. This stored signal represents the actual position of the slide 122' of the rear shifter actuator 54. The rear shifter signal calibration store 184 stores the shifter calibration signals which represent the five positions of slide 122' for chain engagement respectively with the five rear sprockets 1 through 5. The rear shifter position signal in store 176 is compared with the rear shifter calibration signal stored in store 184 and when they are equal, both of the outputs 188 and 192 go to logic 0 and the servomotor of actuator 54 is deenergized. The actuator remains deenergized and holds the slide 122' stationary until it receives a control signal for either retraction or extension of the slide. The next control signal will be produced at outputs 188 and 192 as an extend, retract or standstill signal in accordance with the need for shifting.

Control Of Speed Range

The automatic shifter of this invention facilitates upshifting in the order of successively increasing speed ranges and downshifting in the reverse order. Further, it enables implementation of a ratio-changing transmission with any desired shift pattern and with a preselected number of speed ranges equal to or less than the total number of sprocket combinations.

In an exemplary ten speed bicycle, such as a Raleigh Gran Prix Model No. DL-115, the front sprockets A and B have forty and fifty-two teeth, respectively, and the rear sprockets 1, 2, 3, 4 and 5 have twenty-eight, twenty-four, twenty, seventeen and fourteen teeth, respectively. In Table I below, the ten different speed ranges are shown in an order which results from combining the front and rear sprockets in the following sequence: the smaller front sprocket is combined with each of the five rear sprockets successively from the largest to the smallest and then the larger front sprocket is combined with each of the five rear sprockets successively in the same sequence. This sprocket combination ordering might be considered a logical shift pattern, at least to an inexperienced cyclist, for obtaining a successively increasing gear ratio. However, as shown in Table I, the order of the gear ratios and speed ranges obtained from this shift pattern is not continuously progressive. The shift pattern required for progressive increase of speed range from one to ten would be difficult to memorize. It would be more difficult for a rider to remember how to upshift or downshift from any given speed range.

TABLE I

| SPROCKET COMBINATION ORDERING | | |
| --- | --- | --- |
| Sprocket Combination | Speed Range | Gear Ratio |
| A-1 | 1 | 1.43 |
| A-2 | 2 | 1.67 |

TABLE I-continued

| SPROCKET COMBINATION ORDERING | | |
| --- | --- | --- |
| Sprocket Combination | Speed Range | Gear Ratio |
| A-3 | 4 | 2.00 |
| A-4 | 6 | 2.35 |
| A-5 | 8 | 2.86 |
| B-1 | 3 | 1.86 |
| B-2 | 5 | 2.16 |
| B-3 | 7 | 2.60 |
| B-4 | 9 | 3.06 |
| B-5 | 10 | 3.71 |

It is noted from Table I that shifting in the sprocket combination order results in successive upshifts except for the downshift which occurs upon the shift from front sprocket A to sprocket B. Further, it is observed that this provides two distinct sets of speed ranges, namely sprocket combinations A-1 through A-5 and B-1 through B-5 each of which exhibits continuously progressive increase of speed range. Note however, that the upper set of speed ranges includes some gear ratios lower than some in the lower set.

In Table II, the ten speed ranges are listed in numerical order and hence with progressively increasing gear ratios to illustrate the sequence of sprocket combinations required.

TABLE II

| SPEED RANGE ORDERING | | |
| --- | --- | --- |
| Speed Range | Gear Ratio | Sprocket Combination |
| 1 | 1.43 | A-1 |
| 2 | 1.67 | A-2 |
| 3 | 1.86 | B-1 |
| 4 | 2.00 | A-3 |
| 5 | 2.16 | B-2 |
| 6 | 2.35 | A-4 |
| 7 | 2.60 | B-3 |
| 8 | 2.86 | A-5 |
| 9 | 3.06 | B-4 |
| 10 | 3.71 | B-5 |

It is noted that Table II shows that successive upshifts (or downshifts) in shifting through all speed ranges can be obtained but only by the specified sequence of sprocket combinations.

In Table III the sprocket combinations are listed in the order of speed range number and the control signals are shown for sequentially upshifting from the lowest to the highest speed range and for downshifting from the highest to the lowest speed range.

TABLE III

| SPEED RANGE ORDERING TEN SPEED - CONTROL SIGNALS | | | | | | |
| --- | --- | --- | --- | --- | --- | --- |
| Speed Range No. | Sprocket Combination | Gear Ratio | Up Control Signal[1] | | Down Control Signal[1] | |
| | | | Front | Rear | Front | Rear |
| 1 | A-1 | 1.43 | 00 | 10 | 00 | 00 |
| 2 | A-2 | 1.67 | 01 | 01 | 00 | 01 |
| 3 | B-1 | 1.86 | 10 | 10/10 | 10 | 10 |
| 4 | A-3 | 2.00 | 01 | 01 | 01 | 01/01 |
| 5 | B-2 | 2.16 | 10 | 10/10 | 10 | 10 |
| 6 | A-4 | 2.35 | 01 | 01 | 01 | 01/01 |

TABLE III-continued

SPEED RANGE ORDERING
TEN SPEED - CONTROL SIGNALS

| Speed Range No. | Sprocket Combination | Gear Ratio | Up Control Signal[1] Front | Up Control Signal[1] Rear | Down Control Signal[1] Front | Down Control Signal[1] Rear |
|---|---|---|---|---|---|---|
| 7 | B-3 | 2.60 | 10 | 10/10 | 10 | 10 |
| 8 | A-5 | 2.86 | 01 | 01 | 01 | 01/01 |
| 9 | B-4 | 3.06 | 00 | 10 | 10 | 10 |
| 10 | B-5 | 3.71 | 00 | 00 | 00 | 01 |

[1]Footnote:
10 means go to smaller sprocket
01 means go to larger sprocket
00 means no change Table III shows that certain upshifts and downshifts require two successive control signals, i.e. 10/10 and 01/01, for two successive transitions of the chain on the rear sprockets because one sprocket is "skipped", i.e. only momentarily engaged.

In order for the automatic shifter to respond to upshift and downshift demands it is necessary to generate control signals which depend upon the existing status of the shifter, i.e. the engaged speed range which is a function of the combination of front and rear sprockets which are engaged by the chain. As shown by Table III, if the shifter is in speed range number 1, for example, the upshift control signal is 00 (front) and 10 (rear) and results from an upshift demand. If the shifter is in speed range number 2, the upshift control signal is 01-01. By inspection, it can be seen that there may be a different control signal for upshift depending on the engaged speed range. Accordingly, a look-up table containing the shift pattern and the shifter control signal for each speed range is provided in ROM 186 in the microcomputer. As will be described below in connection with the Shifter Control Module of Appendix F, the sprocket combination, and hence the speed range, which is engaged by the automatic shifter can be ascertained by comparing the stored front and rear shifter position signals with the stored front and rear calibration signals, respectively.

As shown in Table III, for the illustrative embodiment of the invention, the gear ratios are listed in the order of numerical magnitude and are designated by speed range numbers 1 through 10 corresponding to the sequentially increasing gear ratios. This ordering of the gear ratios is referred to herein as the "shift pattern" of the automatic transmission and is defined by the order of the speed range numbers. In the example of Table III, the shift pattern is progressive in the sense that successive upshifts from the lowest gear ratio includes the gear ratios in the order of progressively increasing magnitude and vice-versa for successive downshifts. This shift pattern also includes all gear ratios available from the transmission, i.e. none of the gear ratios are skipped in the shifting sequence.

In accordance with this invention, alternative shift patterns can be established in the automatic shifter on the same bicycle. For example, a shift pattern can be established in the automatic control system which selectively skips certain gear ratios available from the transmission. Further a shift pattern can be established which is a combination of progressive and regressive shifts. For example, the shift pattern may be divided into a low speed range and a high speed range with the gear ratio at the high end of the low speed range being higher than the gear ratio at the low end of the high speed range. See for example, Table I. This is progressive within each range but regressive between ranges.

As an alternative embodiment of the invention, the automatic shifter may be adapted to operate a ten speed bike as though it were a five speed or three speed bike at the option of the rider. For this purpose, a separate look-up table is provided in the ROM 186 for each of the ten speed, five speed and three speed bikes. In the implementation of this embodiment, the control panel may be provided with a separate manually actuable selector switch for the ten speed, five speed and three speed operations.

As shown in Table IV the ten speed bicycle may be operated as a five speed with the automatic shifter. This is accomplished by configuring the shifter with a selected set of five speed ranges in a desired shift pattern. Table IV shows a shift pattern comprising speed ranges designated as 1' through 5' in the first column (for the five speed set) which correspond, respectively, with speed ranges 1, 3, 5, 7 and 10 (shown in parenthesis) of the ten speed set of Table III.

TABLE IV

SPEED RANGE ORDERING
FIVE SPEED - CONTROL SIGNALS

| Speed Range | Sprocket Combination | Gear Ratio | Up Control Signal Front | Up Control Signal Rear | Down Control Signal Front | Down Control Signal Rear |
|---|---|---|---|---|---|---|
| 1' (1) | A-1 | 1.43 | 01 | 00 | 00 | 00 |
| 2' (3) | B-1 | 1.86 | 00 | 10 | 10 | 00 |
| 3' (5) | B-2 | 2.16 | 00 | 10 | 00 | 01 |
| 4' (7) | B-3 | 2.60 | 00 | 10/10 | 00 | 01 |
| 5' (10) | B-5 | 3.71 | 00 | 00 | 00 | 01/01 |

It is noted that the shift pattern of Table IV is progressive with gear ratio increments being significantly larger than those of Table III.

Table V shows the same ten speed bike configured as a three speed bike. (The speed range notation is the same as in Table IV.)

татабле V

SPEED RANGE ORDERING
THREE SPEED - CONTROL SIGNALS

| Speed Range | Sprocket Combination | Gear Ratio | Up Control Signal Front | Up Control Signal Rear | Down Control Signal Front | Down Control Signal Rear |
|---|---|---|---|---|---|---|
| 1' (2) | A-2 | 1.67 | 01 | 00 | 00 | 00 |
| 2' (5) | B-2 | 2.16 | 00 | 10/10 | 10 | 00 |
| 3' (9) | B-4 | 3.06 | 00 | 00 | 00 | 01/01 |

It is noted that the shift pattern of Table V is progressive with gears ratios selected from the mid-range of Table III.

It will now be appreciated that the automatic shifter can be configured with a selected set of speed ranges in any desired shift pattern.

As discussed above, the selected speed range of the bicycle transmission is determined by the pairing of a selected one of the front sprockets and a selected one of the rear sprockets. For the ten speed bicycle of the illustrative embodiment, the control signals for upshifting or downshifting from any speed ratio number are shown in Table III. This data is stored in the ten speed look-up table in the ROM 186 of the microcomputer. It is accessed for producing the requisite control signal on both outputs 162–164 and 188–192 for controlling the respective front and rear shifter actuators 48 and 54 in accordance with the existing speed range and the demand for change, either upshift or downshift.

Operating Characteristics of the Automatic Shifter

Each bicycle rider has individual preferences and capabilities in powering a bicycle. For each rider these may vary in accordance with the nature of the bicycle trip, e.g. pleasure riding, transportation, or a performance contest and in accordance with the nature of the terrain to be covered. In any case, the speed ranges available from the bicycle transmission are adapted to allow the rider to choose the most effective speed range for the operating conditions and the objective of the trip. In general, the lower speed ranges are useful for hill climbing or for accelerating the bicycle with a pedal force and rotation rate which are acceptable to the rider. The higher speed ranges are useful for cruising at a desired speed on a level road or for descending a hill with acceptable pedal force and rate. The automatic shifter changes to a lower speed range when the force required on the pedals exceeds a predetermined value and changes to a higher speed range when the pedal crank rotational speed exceeds a predetermined value, according to the preferences of the rider.

A typical bicycle rider may tend to maintain the bicycle at a certain road speed for different segments of a trip. The speed will vary with conditions which prevail during a given segment. For example, given a flat and smooth roadway segment with no wind, the rider will tend to hold a speed which suits the rider's purpose at the time. The road speed of a bicycle is, in general, a direct function of the power applied by the rider and an inverse function of the resistance to bicycle motion including slope of the roadway and wind resistance. The power input from the rider is directly proportional to the product of the pedal crank rotational speed and the pedal force applied by the rider. The power input is, of course, limited by the physical capabilities of the rider; the power most persons can deliver to a bicycle transmission system on a sustained basis is a fraction of a horsepower (hp), perhaps about one-fifth hp. Many riders find that pedaling at the rate of about 60 crank RPM is quite agreeable; however, each rider has some upper limit of pedaling speed, perhaps in the vicinity of 100 RPM and does not want to exceed that limit. Also each individual rider may be able to exert a peak value of pedal force somewhat greater than the rider's body weight; however, the rider may not want to apply a sustained average pedal force greater than an upper limit, perhaps about one-half of the rider's body weight. By proper use of the ratio changing power transmission of the bicycle, the various limitations of the rider and the different conditions of operation can be accommodated.

The manner in which the desired operating characteristics are achieved by the automatic shifter of this invention is graphically illustrated in FIG. 8. The graph of FIG. 8 shows pedal force as a function of pedal speed for a constant power input to the bicycle. The graph includes three curves representing the fourth, fifth and sixth speed ranges of the bicycle transmission, each for the same power input. The horizontal line labeled "Force Limit" represents the predetermined value of pedal force F which the rider does not want to exceed. The vertical line labeled "RPM Limit" represents the predetermined value of pedal crank rotational speed which the rider does not want to exceed. The graph represents, as one example, an upshift from fourth speed to fifth speed. With the bicycle operated in fourth speed, the RPM limit is indicated at point A. At this point, the automatic shifter upshifts the transmission to the fifth speed range at point B. Operation at point B permits the rider to pedal at a lower RPM but a higher amount of force is required for maintaining the same power input. Since the power input remains the same, the bicycle road speed remains substantially the same. The graph also shows, as another example, a downshift from sixth speed to fifth speed. With the bicycle operating in the sixth speed range, it is assumed, for example, that the rider is on a gradual uphill slope and the pedal force is increased to the predetermined limiting value at point C. In response to this limiting value, the automatic shifter downshifts the transmission to fifth speed range at point D. Operation at point D allows the rider to apply a lower pedal force but requires a higher pedal RPM in order to maintain the same power input. Again, the transition is made without an abrupt road speed change.

It is observed, with reference to FIG. 8, that the automatic shifter is adapted to downshift the bicycle transmission when the applied pedal force exceeds the predetermined value F and it is adapted to upshift when the pedal crank RPM exceeds a predetermined value S. The rider may, however, choose to exceed both the pedal force limit F and the pedal speed limit S at the same time. In case that occurs, the controller 72 is programmed to resolve the conflict and call for either an upshift or a downshift or leave the shifter in its existing position. In the illustrative embodiment, the conflict is resolved by programming the controller to produce an upshift to the next higher speed range if it is available.

Figure 9:
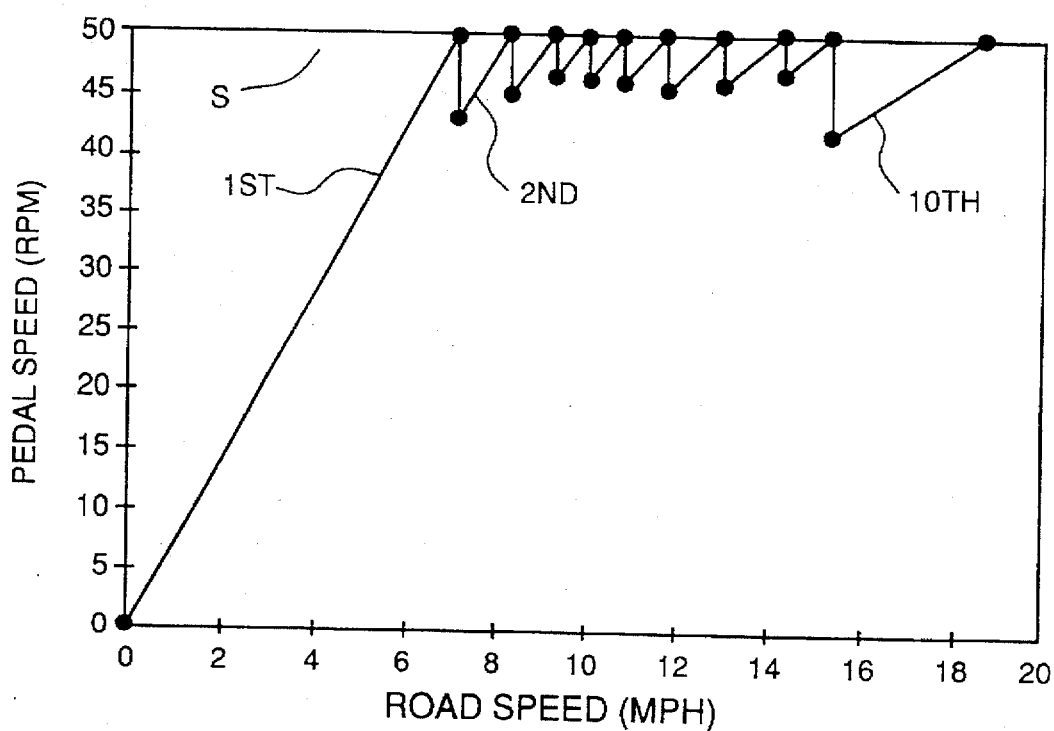
FIG. 9 is a graphical representation of the upshift points in an example of operation of the automatic shifter.
Figure 10:
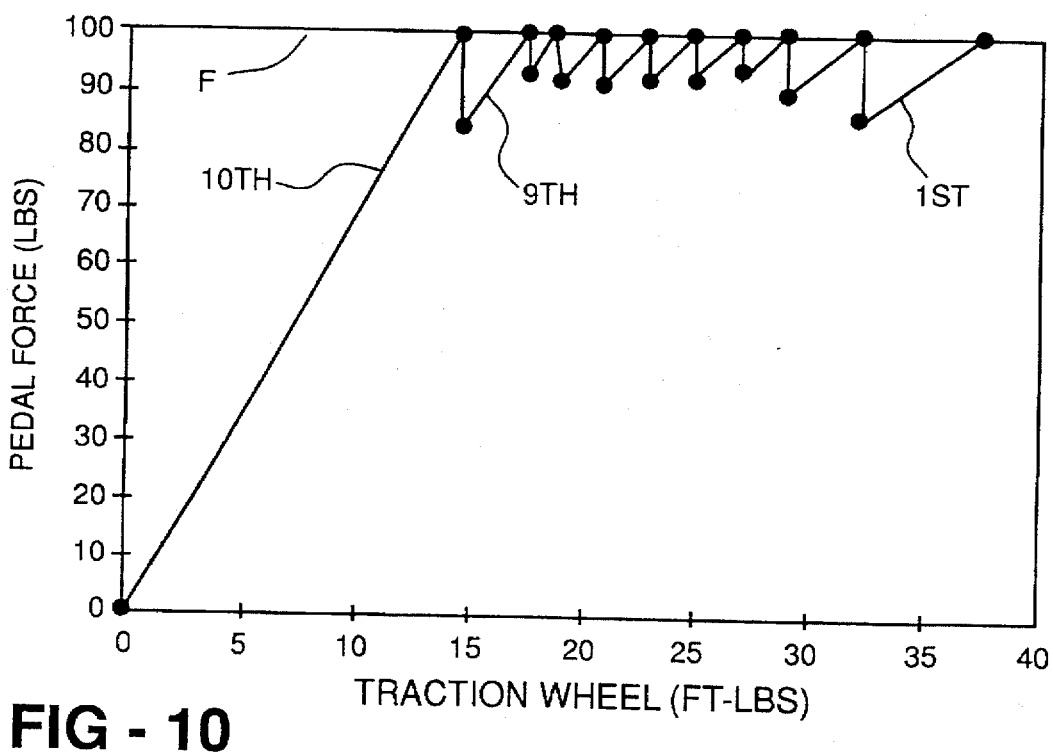
FIG. 10 is a graphical representation of the downs in an example of operation of the automatic shifter.

The operating characteristics of the automatic shifter of this invention are also graphically represented in FIGS. 9 and 10. FIG. 9 shows the upshift points in terms of pedal crank rotational speed as a function of bicycle road speed. It is assumed that the pedal force limiting value F is not exceeded in this example of operation. This graph represents acceleration of the bicycle in the first speed range with increasing pedal crank speed up to the limiting value S. When that speed is reached, the automatic shifter operates to upshift the transmission to the second speed range. As a result of the upshift, the operation in the second speed range commences at a reduced value of pedal crank rotation speed. As the bicycle road speed is increased, the limiting pedal crank rotational speed S is reached again and the automatic shifter upshifts the transmission to the third speed range. This operation continues in the same manner as the bicycle speed is increased in the successive speed ranges with an upshift occurring in each successive speed range at the predetermined pedal crank rotational speed S.

FIG. 10 is a graphical representation of the operation of the automatic shifter showing the downshift points in terms of pedal force as a function of the traction wheel torque. It is assumed that the pedal speed limiting value S is not exceeded in this example of operation. In this graph, operation is depicted wherein the automatic transmission downshifts from a higher speed range to a lower speed range when the pedal force limiting value F is reached in any one of the speed ranges. For example, with operation in the tenth speed range on an uphill slope, additional pedal force is applied to maintain speed until the limiting pedal force value F is reached. At that point, the automatic shifter downshifts the transmission to the ninth speed range which requires a reduced value of pedal force to maintain the same power input provided that the pedal crank rotation rate is increased. Operation in the ninth speed range continues until the limiting force F is reached which causes the automatic shifter to downshift to the eighth speed range. This downshift operation is available from any one of the speed ranges except, of course, the first speed range.

Operation of the Automatic Shifter

The operation of the automatic shifter will now be described with reference to FIGS. 7 and 7a which represent the electronic circuits of the system and with reference to the action diagrams of Appendices A through H which represent the program of the microcomputer 70.

In the action diagrams of Appendices A through H, the lines in each module are numbered sequentially for convenience of reference in the discussion that follows. The notation regarding the control structures in the action diagram is conventional, as follows. Simple sequence statements are preceded by a '–'. Decision statements are preceded by '—' and are bracketed using 'l'. Looping constructs are preceded by '==' and are bracketed with 'l'. In addition, the following notation is used. Lines surrounded by '{' and '}' represent comments. Sections of the program code which are defined as modules are invoked using the "perform" statement. Wherever the term 'record' is used, it is intended to mean "store a value in nonvolatile memory".

The control program of this invention is divided into the following modules: Main Module (Appendix A), Shifter Configuration Module (Appendix B), Rider Calibration Module (Appendix C), Upshift Demand Module (Appendix D), Downshift Demand Module (Appendix E), Shifter Control Module (Appendix F), Shift Actuation Module (Appendix G) and User Request Module (Appendix H).

Main Module of Control Program

Referring now to Appendix A, operation of the automatic shifter will be described in general terms with reference to the Main Module of the control program. As shown in the action diagram of Appendix A, the Main Module is initiated at line 1. At the outset, the module establishes the user input/output requirements as indicated by the comment at line 3. The sequence statement at line 5 is operative to define certain user input selector switches to be selectively actuated by the rider. These input switches are located on the control panel 73 as shown in FIG. 11 and are labelled "Configure", "Up", "Down", "Alternate" and "Enter". The purpose of these input switches will be described below. The next sequence statement on line 6 is operative to define certain output indicators which are located on the control panel and are labelled "Ready" and "Configuration". These indicators are two-state indicators such as light emitting diodes (LEDS). The comment at line 8 is a reminder that it is necessary to properly configure the automatic control system before it is put into use. Accordingly, the decision statement at line 10 determines if the system is not already configured or if the Configure switch has been actuated. If either statement is true, the sequence statement at line 11 is executed and the program branches to execute the Shifter Configuration Module of Appendix B which will be described below. After the Shifter Configuration Module is executed, the program returns to the Main Module at line 12 which ends the decision statement. The program then advances to the next step. If at line 10 both of the decision statements are false, the program advances directly to line 12 which ends the decision statement.

Next, it is necessary to initialize the state of the control program as indicated by the comment at line 14. This includes turning on the "Ready" indicator at line 16 and setting the countdown timers U and D to their initial values at line 17. At this point, the controller 72 is in readiness for the operational mode of the automatic shifter.

With the system ready for operation, a polling loop is started for the purpose of monitoring all inputs to the computer as indicated at line 19. The program advances to the looping construct at line 21 in which all inputs will be monitored successively. This portion of the program within the looping construct, initiated at line 21, represents the operation of the automatic control system while the bicycle is operational, i.e. being ridden. In this operational phase, the sequence statement at line 22 causes the microcomputer to read signal A which represents the instantaneous pedal force value. Then, the statement at line 23 causes the signal B to be read to obtain a pedal rotation rate. The statement at line 24 derives rates of change of the pedal force and the speed values. After deriving this data, the statement 25 causes the program to execute the Upshift Demand Module and thereby check the need for an upshift. If an upshift is needed, the Shifter Control Module and the Shift Actuation Module will be invoked to execute the upshift, as will be described below. Then, the statement at line 26 causes execution of the Downshift Demand Module to thereby check the need for a downshift. If a downshift is needed, the Shift Control Module and the Shift Actuation Module will be invoked as will be described below. Then the program, at the statement of line 27, executes the User Request Module. This module causes either upshift or downshift in response to manual actuation of the "Up" or "Down" switches on the control panel to which override the controller of the automatic shifter. The looping construct initiated at line 21 is repeated over and over until the controller is powered down. This occurs when the bike rider actuates the Power switch on the control panel. In response to the turn-off of power, the program is ended as indicated at line 29.

Shifter Configuration Module

The automatic shifter is configured to the bicycle and to the rider by execution of the Shifter Configuration Module (which performs the Rider Calibration Module) after the automatic system is first installed on the bicycle. When the automatic shifter is part of the original equipment, the Shifter Configuration Module may be executed at the factory, at the retail dealership or by the owner. In a retrofit installation of the automatic shifter, the execution of the Shifter Configuration Module may be done by the owner of the bicycle.

Before describing the Shifter Configuration Module, an overview of its function will be given. The process performed by the Configuration Module is effective to calibrate the automatic control system to the particular bicycle power transmission and to calibrate it to the individual rider's preferences.

The power transmission calibration establishes the required movements of the power actuators of the controller to re-position the derailleurs for shifting from one sprocket to another. For this, a calibrated position is determined for each of the front sprockets and for each of the rear sprockets and the shifter calibration signals corresponding thereto are stored in the shifter calibration stores 182 and 184 referred to above. In the illustrative embodiment for a ten speed shift pattern, the shifter calibration is established by the performance of the Shifter Configuration Module.

In the illustrative embodiment, the shift pattern is defined in the look-up table in the ROM 186 and is shown in Table III, i.e. speed ranges in the order of 1 through 10. Preferably, the first speed range is processed first so the rider may proceed through the calibration process on a somewhat intuitive basis, taking speed ranges one through ten in sequence. When the calibration procedure is to be started, the bicycle chain may have been left on any combination of front and rear sprockets, i.e. in any arbitrary speed range. It will then be necessary for the rider to manually control shifting by the Up, Down and Alternate switches on the control panel to select speed range number 1. The sprocket combination to be selected is A1. (The person doing the calibrating will need to have a table like Table III for the particular bicycle. The table will show the sprocket combination and the gear ratio for each successive speed range number. Such a table can be readily constructed by counting the number of teeth on each sprocket and calculating the gear ratio.)

For manually selecting speed range 1, the front shifter position is calibrated first for front sprocket A by actuating the Alternate switch and moving the front shifter using manual control switches "Up" and "Down" on the control panel. (Actuation of the manual Alternate switch enables manual control of the front shifter by the Up and Down switches; deactuation of the Alternate switch enables control of the rear shifter by the Up and Down switches.) The Up switch moves the shifter toward the larger sprocket and the Down switch moves it toward the smaller sprocket. The calibration is carried out with the bicycle being pedaled and visual checking of the chain position relative to the desired sprocket. After the shifter calibration position is determined for the front shifter, the shifter calibration signal representing that position is entered in the calibration signal store 182. Next, the rear shifter calibration position is established for the rear sprocket number 1 deactuating the Alternate switch and using the Up and Down switches. The shifter calibration signal for rear sprocket number 1 is then stored in the shifter calibration store 184. Next, the same calibration process is performed for speed range number 2 and then for speed range numbers 3 through 10 in that order. It will be understood that this calibration procedure involves placing each shifter in the same calibration position more than once whereas it is necessary to record the shifter position for each sprocket only once. Other procedures may be used which will not require such repetitive positioning of the shifters.

The Shifter Configuration Module will now be described with reference to Appendix B. As shown in the action diagram, the module is initiated at line 1. The comment in lines 3 through 8 sets forth a general description of the general process performed by the module.

The sequence statement on line 10 is effective to turn on the Configuration Indicator and the statement on line 11 sets the speed ratio counter to 1. As described above, the rider must manually control the shifting by using the Up and Down switches in order to put the shifter in the first speed range (The terms "speed ratio" and "speed range" are used interchangeably.).

The program advances to a looping construct at line 12 and a loop will be entered which will continue until the user actuates the Configure switch. At line 13 a subsidiary looping construct is entered which will repeat until the user actuates the Enter switch. The decision statement at line 14 determines whether the Alternate switch is actuated. If it is, the program advances to the decision statement at line 15 which determines whether the rider actuated the Up switch. If so, the program advances to line 16 which moves the front shifter towards the larger sprocket. If the rider had actuated the Down switch, as determined at line 17, then line 18 moves the front shifter toward the smaller sprocket. At line 19, the decision statement of line 15 is ended.

If at line 14, it had been determined that the Alternate switch was not actuated the program would have branched to the else statement at line 20. Then the program would advance to the decision statement at line 21 to determine if the rider had actuated the Up switch. If so, line 22 would cause the rear shifter to move toward the larger sprocket. If the rider had operated the Down switch, as indicated at line 23, the program would advance to line 24 which would cause the rear shifter to move toward the smaller sprocket. The decision statement of line 21 is ended at line 25. The decision statement of line 14 is ended at line 26. Then, after the rider has actuated the Enter switch on the control panel, the looping construct which started at line 13 will end at line 27. Next, the program advances to line 28 and records the front and rear shifter positions in the shifter calibration signal store 182 and 184, respectively. That completes the calibration of the front and rear shifter for the speed ratio number 1. The program at line 29 increments the speed ratio counter by one count and the program loops back to line 13 to repeat the loop for the speed ratio number 2. This loop is repeated for each of the successive speed ratio numbers 3 through 10, in that order. Then, the user will press the Configure switch and the program at line 30 will end the looping construct which started on line 12. Next, at line 31, the program branches to the Rider Calibration Module of Appendix C which will be described presently. After the Rider Calibration module is performed, the program returns to line 32 of the Shifter Configuration Module and the Configuration Indicator on the control panel is turned off. At line 33, the module is ended.

Rider Calibration Module

As discussed above, the operating characteristics of the automatic shifter are adapted to the preferences and capabilities of the individual bicycle rider. This is provided by the Rider Calibration Module of the control program as represented in Appendix C. As previously discussed, the individual rider may set predetermined values of pedal force F and pedal speed S which the rider does not want to exceed. The limiting value of these parameters which the rider chooses may depend upon the nature of the bicycle ride to be undertaken.

The automatic shifter is calibrated for the individual rider preferences by the process executed by the Rider Calibration Module as will be described presently. When the Shifter Configuration Module of the control program is performed, as described above, it branches at line 31 to perform the Rider Calibration Module to establish the parameters according to the individual's preferences. The same rider, or a different rider, may wish to change the calibration parameters from time-to-time. The control program facilitates such changes by a provision in the User Request Module of Appendix H, which will be described subsequently.

The Rider Calibration Module is initiated at line 1. The comments in lines 3 through 7 give a general description of the process which is performed by this module. At line 9, a looping construct is entered for establishing the limiting value of pedal force F. First, a force value is derived from signal A as indicated at line 10 and then it is recorded at line 11 in the pedal force limit store 173 of FIG. 7A. This loop is repeated until the user presses the Enter switch which ends the loop as indicated at line 12. Next, the program enters into a looping construct at line 13 for establishing the limiting value of pedal speed S. Line 14 derives the pedal speed from signal B and the current value is recorded at line 15 in the pedal speed data store 175 of FIG. 7A. This loop is continued until the user presses the Configure Switch which ends the loop as indicated at line 16. This completes the rider calibration process and at line 17 the program returns to the Shifter Configuration Module at line 32. At this point, the Configure indicator on the control panel is turned off and the bicycle is ready for use of the automatic shifter in the operational mode.

Operational Mode of Shifter

After the automatic shifter has been configured and calibrated by execution of the Shifter Configuration Module and the Rider Calibration Module as described above, the shifter is in readiness for operational use of the bicycle. As shown in the Main Module of Appendix A, after the performance of the Shifter Configuration Module, the Main Module sets up the initial state of the control program which includes setting and starting the countdown timers and turning on the Ready indicator. As further shown in the Main Module, a polling loop which monitors all inputs is started. After sequentially deriving pedal speed and pedal force values, the Main Module invokes the Upshift Demand Module at line 25.

Upshift Demand Module

Before describing the Upshift Demand Module, it will be helpful to consider the conditions which may be used to initiate an upshift of the power transmission. One criteria for producing a demand for an upshift is that the average pedal speed over a predetermined time interval, for example about two to five seconds, exceeds the predetermined limit speed. In the illustrative embodiment of the invention, this is accomplished by determining whether the pedal speed exceeds the limit speed at multiple points in time within a predetermined time interval. For this, the microcomputer compares the measured speed repeatedly with the predetermined speed and a countdown timer in the microcomputer establishes the time interval. As an alternative, the average pedal speed can be obtained by counting the number of pulses in the speed signal during successive time intervals of constant duration.

In addition to the pedal speed criteria discussed above, an upshift may be provided in response to a predetermined threshold value of time rate of change of pedal speed. This permits the rider to force an upshift in certain operating conditions.

The Upshift Demand Module will now be described with reference to Appendix D. This module, which is initiated at line 1, is operative to determine whether operating conditions of the bicycle require an upshift. The decision statement at line 3 determines whether the shifter is currently in the highest speed ratio. If it is, an upshift cannot be performed and the program branches to line 16 and thence it proceeds to the end of the module at line 17. If it is not, the sequence statement at line 4 checks the current pedal speed. The decision statement at line 5 then determines whether the pedal speed is higher than the predetermined limit value S. (If it is not, the program branches to the "else" decision statement at line 13. It then proceeds to line 14 which stops the countdown timer and resets it for a new timer cycle which will be discussed below.) If the pedal speed is higher than the predetermined limit value and if the countdown timer U is stopped, as determined by the decision statement at line 6, then at line 7 the program starts the countdown timer U. If at line 6, it is determined that the countdown timer U is not stopped and, as determined at line 8 it has reached zero, then line 9 causes the program to branch and perform the Shifter Control Module of Appendix F which will be described presently.

If at line 8 it is determined that the countdown timer had not reached zero, the program advances to line 10 which determines whether the rate of change of pedal speed exceeds a predetermined threshold value. If it does, the program advances to line 11 which causes the program to branch and perform the Shifter Control Module of Appendix F. This operation permits the rider to achieve an upshift without time delay by momentarily accelerating the pedal rotation. This may be used, for example, where the rider has just crested a hill and desires an immediate upshift. After the Shifter Control Module is performed at line 11, the program returns to the Upshift Demand Module at line 12. If at line 10 the rate of change of pedal speed does not exceed the threshold value, the program advances directly to line 12. At line 12 the decision statement of line 6 is ended.

If at line 5 it is determined that the pedal speed is not higher than the predetermined limit, the program branches to line 13 and then advances to the sequence statement at line 14 which stops the countdown timer U and resets it for start of a new timer cycle. This places it in readiness for the next pass through the Upshift Module. (The polling loop in the Main Module which begins on line 21 is executed in a time interval measured in microseconds which results in a very large number of speed checks in each cycle of the countdown timer.) Then the program advances successively to lines 15 and 16 which end the corresponding decision statements. At line 17 the module is ended and the program returns to the Main Module of Appendix A at line 26 which causes the program to branch to the Downshift Demand Module of Appendix E.

Thus, the countdown timer U operates to inhibit an upshift unless each check of the pedal speed, during a full cycle of the countdown timer, shows that it exceeds the predetermined limit value. This prevents unnecessary shifting in response to instantaneous occurrences of pedal speed in excess of the predetermined limit.

Downshift Demand Module

Before describing the Downshift Demand Module the conditions which may be used to produce a downshift will be considered. As discussed above, one criteria is that the average pedal force over a predetermined time interval exceeds the predetermined limit force F. The predetermined time interval is, for example, about two to five seconds. In the illustrative embodiment, this is accomplished in the same manner as described above with reference to the average pedal speed.

In addition to the above criteria, a forced downshift may be provided by determining whether the time rate of change of pedal force exceeds a predetermined threshold. If so, a downshift is provided regardless of the average value of pedal force.

In order to inhibit a downshift signal with the bike at a standstill, a predetermined minimum pedal speed is used as a condition for downshifting.

The Downshift Demand Module will now be described with reference to Appendix E. This module is similar to the Upshift Demand Module but has a special feature to determine whether the pedal speed has a certain minimum value. This Module is initiated at line 1 and determines whether there is a need for a downshift. The decision statement at line 3 determines whether the shifter is currently in the lowest speed ratio. If it is, the program branches to line 20 and thence advances to the end of the module at line 21 and returns to the Main Module at line 27. If it is not in the lowest speed ratio, the program advances from line 3 to line 4 which checks the current pedal speed. The decision statement at line 5 then determines whether the pedal speed has reached a predetermined minimum value which is indicative that the bicycle is not at a standstill and thus is able to perform a downshift command. If it is determined that the pedal speed has not reached the minimum value the program branches to line 19 and thence proceeds to the end of the module. If the pedal speed has reached the predetermined minimum value and, as determined at line 6, it has reached the predetermined limit value S the program branches to line 19 and thence advances to the end of the module. If, on the other hand, the pedal speed has reached the predetermined minimum value and has not reached the predetermined limit value S, the program advances from line 6 to line 7 which checks the pedal force value. Then, the decision statement at line 8 determines whether the pedal force is higher than predetermined the limit value F. If it is not, the program branches to line 16 and thence proceeds to the sequence statement at line 17 which stops and resets the countdown timer D to place it in readiness for the next pass through the module. If the pedal force is higher than the limit, it is determined at line 9 whether the countdown timer D is stopped. If it is, the sequence statement at line 10 causes the countdown timer D to be started. If it is not stopped, the program branches to line 11 which determines whether the countdown timer D has reached zero. If it has, the program advances to line 12 which causes the program to branch and perform the Shifter Control Module of Appendix F.

If countdown timer D has not reached zero, as determined at line 11, the program branches to line 13 which determines whether the rate of change of pedal force exceeds a predetermined threshold. If it does, the program advances to line 14 which causes the program to branch and perform the Shifter Control Module of Appendix F. If it does not exceed the threshold, the program branches from line 13 to line 15. Thus, the countdown timer D operates to inhibit a downshift unless each check of the pedal force, during a full cycle of the countdown timer, shows that it exceeds the predetermined limit value F. This prevents undesirable shifting in response to instantaneous occurrences of pedal force in excess of the predetermined limit.

The program proceeds from line 15 to the end of the module at line 21 and returns to the Main Module of Appendix A at line 27. The Main Module then causes the program to perform the User Request Module of Appendix H which will be described subsequently.

Shifter Control Module

In the operation of the automatic shifter as thus far described, the Upshift Demand Module of Appendix D may call for an upshift and the Downshift Demand Module of Appendix E may call for a downshift. In case either an upshift or a downshift is called for, the Shifter Control Module of Appendix F is invoked. This module is shown in Appendix F and will be described in detail below. Before the module is described, an overview of its operation will be given.

As stated above, the Shifter Control Module is invoked when either an upshift or a downshift is called for; it then determines which combination of front and rear sprockets is required for the next higher or the next lower speed ratio, as the case may be. For this purpose, this module utilizes the look-up table in ROM 186 which is shown in FIG. 7 and was described with reference to the Shifter Configuration Module and Table III. The look-up table stores information corresponding to that of Table III. When either an upshift or a downshift is to be executed, with the transmission in any one of the ten different shift states, the microcomputer accesses (from the look-up table) the control signal for both front and rear sprockets to produce the desired sprocket combination. For example, assume that the rider mounts the bicycle with the transmission in speed range number 3, the shift state in which the transmission was left after the last ride. As shown in Table III, the sprocket combination is the large front sprocket B and the largest rear sprocket 1. When the rider starts out from a standstill, it will be assumed that the Downshift Demand Module calls for a downshift. As shown in Table III, the downshift control signal for the front sprocket is 1-0 and for the rear sprocket it is also 1-0. This means that the chain is to be transferred from the larger front sprocket B to the smaller front sprocket A and from the larger rear sprocket 1 to the smaller rear sprocket 2. In this shift, only one transition is needed for both the front and rear sprockets, i.e. the chain is to be transferred to the immediately adjacent sprocket in both cases. It will be assumed that after the rider has pedaled the bike for a while in speed range number 2, an upshift is called for. The upshift control signal, as shown in Table III, is 0-1 for the front sprocket and it is also 0-1 for the rear sprocket. This means that the chain is to be transferred from the smaller front sprocket A to the larger front sprocket B and from the smaller rear sprocket 2 to the larger rear sprocket 1. Next, assume that another upshift is called for from speed ratio number 3. For this, the upshift control signal for the front sprocket is 1-0 and for the rear sprocket it is 1-0/1-0, the latter notation meaning that two transitions are required for the chain at the rear sprocket set. For the front shifter the chain will be transferred in a single transition from the larger sprocket B to the smaller sprocket A. Then for the rear shifter the chain will be transferred from the larger sprocket 1 in a first transition to the adjacent smaller sprocket 2. In this transitory state, the sprocket combination of A2 is actually a downshift from speed range number 3 to speed range number 2, whereas an upshift was called for from speed range number 3 to speed range number 4. In order to achieve this upshift, the program recognizes that two transitions are necessary and the upshift control signal is maintained in effect so that second transition is performed by shifting the chain from the larger rear sprocket 2 to the smaller rear sprocket 3. This illustrates the manner in which the desired upshifts and downshifts are accomplished in order to shift the transmission in the order of gear ratio, i.e. in the numerical order of speed range number.

Referring now to Appendix F, the action diagram of the Shifter Control Module will be described. The module is initiated in line number 1 to shift to the next lower or higher speed range. The comments in lines 3 through 6 describe the general process which is performed by the module.

The sprocket combination, and hence speed range, which is engaged by the automatic shifter at any time during operation can be determined by comparing the stored front and rear shifter position signals with the stored front and rear calibration signals, respectively. In particular, the chain is engaged with front sprocket A when the stored front shifter position signal in store 174 is equal to the stored calibration signal for sprocket A in store 182. It is engaged with sprocket B when position signal in store 174 is equal to the stored calibration signal for sprocket B in store 182. The rear sprocket with which the chain is engaged is determined in the same manner. Thus, the engaged speed range at any time during operation is ascertained by the microcomputer 70 by comparing the position signals with the calibration signals for both the front and rear shifters. The engaged speed range is given by the combination of the engaged front and rear sprockets, as stored in look-up table in ROM 186 and shown in Table III. The engaged speed range may be displayed to the rider on the control panel by a read-out display unit, not shown.

Referring further to Appendix F, the decision statement at line 8 determines whether the demand is a demand for a lower speed range. If it is, the program advances to line 9 and the table entry in the look-up table 186 is found for the next lower speed range and the program branches to line 14. If it was not a demand for a lower speed ratio number (downshift) the program branches from line 8 to line 10 of the decision statement and then at line 11, the table entry for the next higher speed ratio number (upshift) is found and the program branches to line 14. The decision statement of line 8 is ended at line 12.

For either a downshift or upshift, the look-up table entry is examined at line 14 to determine whether a front sprocket shift is required. If it is determined that a front sprocket shift is not required, the program branches to line 23 which will be described below. If at line 14 it is determined that a front sprocket shift is required, the program advances to the looping construct at line 15. Here the program enters a loop which will be repeated until there are no more front sprocket shift demands in the table entry. (There will be only one shift demand in the table entry for a bicycle with only two front sprockets, as in the example being described. However, the Shifter Control Module is adapted to provide control for a bicycle with three or more front sprockets wherein more than one shift may be demanded by the table entry.) At line 16 the decision statement determines whether the shift demand is for a shift to a smaller sprocket. If it is, the program advances to line 17 at which the program branches to the Shift Actuation Module of Appendix G. (The Shift Actuation Module, which may be invoked by the Shifter Control Module at this or other points, will be described subsequently.) If at line 16 it is determined that the demand is not for a shift to a smaller sprocket, the program goes to the else statement at line 18 and thence to line 19 which causes the program to branch to the Shift Actuation Module. The decision statement of line 16 is ended at line 20 and the program advances to line 21 which ends the loop if there are no more shift demands in the table entry. If there are, the program loops back to line 15 and repeats down to line 21 until all shift demands are satisfied. Then, at line 22, the decision statement of line 14 is ended and the program advances to line 23.

The decision statement at line 23 determines whether the look-up table entry indicates the need for a rear sprocket shift. If it does not, the program branches to line 31 and the program advances to line 32 which ends the module and returns the program to the Main Module which invokes execution of the User Request Module, which will be described below. If at line 23 it is determined that the table entry indicates a rear sprocket shift, the program advances to the looping construct at line 24 and enters a loop which is repeated until no more shift requests remain in the table entry. This looping construct for the rear sprocket shift request is executed in the same manner as the looping construct of line 15 for front sprocket shift request, as described above. Then at line 32, the program is returned to line 27 of the Main Module to perform the User Request Module.

Before describing the User Request Module, however, it remains to describe the Shift Actuation Module. As noted above, the Shifter Control Module invokes the Shift Actuation Module at one or more points in the module. At each such point, program control is returned to the Shifter Control Module after execution of the Shift Actuation Module, which will be described next.

Shift Actuation Module

As described above, the Shifter Control Module determines whether a demand for Shift by either the Upshift Demand Module or the Downshift Demand Module requires a front sprocket shift, a rear sprocket shift or both. In each of these cases, the Shift Actuation Module is invoked for the purpose of carrying out the required shift.

Referring now to the Shift Actuation Module as shown in Appendix G, the module is initiated at line 1. The comments of lines 3 through 6 describe the process performed by the module.

The decision statement at line 8 determines whether the request is for a larger sprocket. If it is, the program enters a looping construct at line 9. Then at line 10, the front shifter actuator or the rear shifter actuator, as specified is moved toward the next larger sprocket. At line 11, the desired position for the shifter, which is stored in the shifter calibration signal store 182 or 184, is compared with the current shifter position signal in the signal store 174 or 176, as the case may be. At line 12 the program loops back to line 9 and repeats until the shifter is in the desired position. Then, the program branches from line 12 to line 18 and advances to the end of the module at line 19. Then the program returns to Shifter Control Module for the continued execution of that module.

If the request is not for a larger sprocket, the program branches to the else statement at line 13 for processing a request for a smaller sprocket. At line 14, the program enters a looping construct like that at line 9, as described above, and the actuator is moved until the shifter is in the desired position. Then, the decision statement of line 13 is ended at line 18. After line 18, the module is ended at line 19 and the program returns to the Shifter Control Module for the continued execution of that module.

As described above, after completion of the Shifter Control Module, the program returns to the Main Module; at this point in the Main Module, the program branches to the User Request Module of Appendix H which will be described below.

User Request Module

The program is provided with a User Request Module in order to permit the cyclist at any time to (1) configure the automatic shifter to the bicycle and to calibrate for the rider's preferences and (2) override the automatic shifter with a manual upshift or a manual downshift command. This module will be described with reference to Appendix H. It is executed at line 27 in the Main Module.

As shown in Appendix H, the User Request Module is initiated at line 1. As described in the comments of lines 3 through 6, this module will respond to the manual Up, Down, Alternate and Configure switches on the control panel. The decision statement at line 8 determines whether the Configure switch is actuated. If not, the program branches to line 16 and thence to the end of the module. If it is actuated, the program advances to line 9 which turns off the Ready indicator and causes execution of the Shifter Configuration Module in Appendix B as called for by the perform statement of line 10. Then, in line 11, the Ready indicator is turned back on. If the Configure switch is not actuated, as determined at line 8, the program branches to the else-if statement of line 12 which determines whether the Up switch is actuated. If it is, the program advances to line 13 which causes execution of the Shifter Control Module of Appendix F. If at line 12 it is determined that the Up switch is not actuated, the program advances to line 14 which determines whether the Down switch is actuated. If it is, the program at line 15 causes execution of the Shifter Control Module of Appendix F.

Summary of Operational Mode

As described above, with reference to the main module of FIG. 12, during the operational mode of the automatic shifter, the controller 72 under control of the main module continuously repeats a loop in which the following steps are sequentially performed: (1) derive a pedal force value, (2) derive a pedal speed value, (3) update the pedal force average value, (4) check for upshift need and if needed energize the appropriate actuator or actuators, (5) check for downshift need and if needed energize the appropriate actuator or actuators, and (6) check for user's requests and perform any such requests. This loop is continuously repeated until the controller is powered down which ends the operational program.

CONCLUSION

An automatic speed range shifter for bicycles and other velocipedes has been disclosed and is a significant improvement over the prior art in respect to method, structure and operational features.

The method utilizes criteria for upshifting and downshifting such that the need for shifting is determined at the earliest perceptible time—well before the rider would sense it from physical discomfort or any other observation. Upshifting is initiated when the pedal speed increases above a predetermined average value. Downshifting is initiated when the pedal force increases above a predetermined average value. Upshifting is also initiated when the time rate of change of pedal speed increases above a predetermined threshold, regardless of the pedal speed value. Similarly, downshifting is initiated when the time rate of change of pedal force increases above a predetermined threshold, regardless of the pedal force value.

The automatic shifter of the invention comprises a pedal crank speed sensing means and a pedal force sensing means, a servo motor for actuating a control member for upshifting or downshifting the power transmission, and a microcomputer responsive to speed and force signals from the sensing means for initiating the energization of the servo motor to upshift the transmission when the average pedal speed increases to a predetermined value and for initiating the energization of the servo motor to downshift the transmission when the average pedal force increases to a predetermined value.

The automatic shifter is adapted for installation on a conventional bicycle either as a factory installation or as a retrofit. It is especially well adapted for use with any conventional derailleur or other conventional ratio-changing bicycle transmission. It requires only a small number of mechanical and electronic components and in case it becomes inoperative, the manual shifter can be easily reinstated.

Although the description of this invention has been given with reference to a particular embodiment, it is not to be construed in a limiting sense. Many variations and modifications will now occur to those skilled in the art. For a definition of the invention, reference is made to the appended claims.

Appendix A - Main Module

P-301 RAE 71

```
1   -- Main Module
2   |
3   |    { Establish the user input / output requirements. }
4   |
5   |    - define input switches: Configure, Up, Down, Alternate, Enter
6   |    - define output indicators: Ready, Configuration
7   |
8   |    { Make sure the control unit is properly configured before use. }
9   |
10  |    -- if (not configured) or (Configure switch actuated)
11  |    |    - perform (Shifter Configuration)
12  |    -- end if
13  |
14  |    { Set up the initial state of the control program. }
15  |
16  |    - turn on Ready indicator
17  |    - set countdown timers U and D to initial value
18  |
19  |    { Start a polling loop to monitor all inputs. }
20  |
21  |    == repeat
22  |    |    - derive a pedal force value from signal A
23  |    |    - derive a pedal speed value from signal B
24  |    |    - derive rates of change for pedal force and speed values
25  |    |    - perform (Upshift Demand)
26  |    |    - perform (Downshift Demand)
27  |    |    - perform (User Request)
28  |    -- until powered down
29  -- end of program
```

P-301 RAE  72
Appendix B - Shifter Configuration Module

```
1   -- Shifter Configuration Module
2   |
3   |   { The user will calibrate each speed ratio in succession, starting
4   |       with the lowest speed ratio, by pressing Up and Down switches
5   |       until the gears are aligned properly, and by pressing the
6   |       Enter switch when this is accomplished. When all gears have
7   |       been positioned, the user will press the Configure switch to
8   |       indicate completion. }
9   |
10  |   - turn on Configuration indicator
11  |   - set speed ratio counter to 1
12  |   == loop until the user actuates the Configure switch
13  |   |   == loop until the user actuates the Enter switch
14  |   |   |   -- if (Alternate switch is actuated)
15  |   |   |   |   -- if (Up switch is actuated)
16  |   |   |   |   |   - move front shifter toward larger sprocket
17  |   |   |   |   -- else if (Down switch is actuated)
18  |   |   |   |   |   - move front shifter toward smaller sprocket
19  |   |   |   |   -- end if
20  |   |   |   -- else
21  |   |   |   |   -- if (Up switch is actuated)
22  |   |   |   |   |   - move rear shifter toward larger sprocket
23  |   |   |   |   -- else if (Down switch is actuated)
24  |   |   |   |   |   - move rear shifter toward smaller sprocket
25  |   |   |   |   -- end if
26  |   |   |   -- end if
27  |   |   -- end loop
28  |   |   - record front and rear shifter positions
29  |   |   - increment speed ratio counter
30  |   -- end loop
31  |   - perform (Rider Calibration)
32  |   - turn off Configuration indicator
33  -- end of module
```

P-301 RAE 73

Appendix C - Rider Calibration Module

```
1   -- Rider Calibration Module
2   |
3   |   { Calibrate the user-defined threshold setting for pedal force
4   |     and then pedal speed. When the user is exerting the
5   |     maximum desired force on the pedals, s/he will press the
6   |     Enter switch. Next, when the user is pedaling at the maximum
7   |     desired speed s/he will press the Configure switch. }
8   |
9   |   == loop until the user actuates the Enter switch
10  |   |   - derive a force value from signal A
11  |   |   - record the current force value
12  |   -- end loop
13  |   == loop until the user actuates the Configure switch
14  |   |   - derive a pedal speed from signal B
15  |   |   - record the current pedal speed
16  |   -- end loop
17  -- end of module
```

Appendix D - Upshift Demand Module    P-301 RAE

```
1   -- Upshift Demand Module
2   |
3   |    -- if (not presently in highest speed ratio)
4   |    |    - derive a pedal speed from signal B
5   |    |    -- if (pedal speed is higher than limit)
6   |    |    |    -- if (countdown timer U is stopped)
7   |    |    |    |    - start countdown timer U
8   |    |    |    -- else if (countdown timer U has reached zero)
9   |    |    |    |    - perform (Shifter Control - higher speed ratio)
10  |    |    |    -- else if (rate of change exceeds threshold)
11  |    |    |    |    - perform (Shifter Control - higher speed ratio)
12  |    |    |    -- end if
13  |    |    -- else
14  |    |    |    - stop and reset countdown timer U
15  |    |    -- end if
16  |    -- end if
17  -- end of module
```

Appendix E - Downshift Demand Module

```
1   -- Downshift Demand Module                              P-301 RAE 75
2   |
3   |   -- if (not presently in lowest speed ratio)
4   |   |   - derive a pedal speed from signal B
5   |   |   -- if (pedal speed has reached minimum value) and
6   |   |   |     (pedal speed has not reached limit)
7   |   |   |   - derive a pedal force from signal A
8   |   |   |   -- if (pedal force is higher than limit)
9   |   |   |   |   -- if (countdown timer D is stopped)
10  |   |   |   |   |   - start countdown timer D
11  |   |   |   |   -- else if (countdown timer D has reached zero)
12  |   |   |   |   |   - perform (Shifter Control - lower speed ratio)
13  |   |   |   |   -- else if (rate of change exceeds threshold)
14  |   |   |   |   |   - perform (Shifter Control - lower speed ratio)
15  |   |   |   |   -- end if
16  |   |   |   -- else
17  |   |   |   |   - stop and reset countdown timer D
18  |   |   |   -- end if
19  |   |   -- end if
20  |   -- end if
21  -- end of module
```

Appendix F - Shifter Control Module

```
1   -- Shifter Control Module                           P-301 RAE 76
2   |
3   |   { This module is used in conjunction with a shifting table to
4   |       determine which shift combination is required to move the
5   |       chain to the proper front and rear sprockets to achieve the
6   |       next higher or lower speed ratio. }
7   |
8   |   -- if (demand is for a lower speed ratio)
9   |   |   - find table entry for next lower speed ratio
10  |   -- else
11  |   |   - find table entry for next higher speed ratio
12  |   -- end if
13  |
14  |   -- if (table entry indicates front sprocket shift)
15  |   |   == loop until no more shift demands in table entry
16  |   |   |   -- if (demand is for shift to smaller sprocket)
17  |   |   |   |   - perform (Shift Actuation - front, smaller)
18  |   |   |   -- else
19  |   |   |   |   - perform (Shift Actuation - front, larger)
20  |   |   |   -- end if
21  |   |   -- end loop
22  |   -- end if
23  |   -- if (table entry indicates rear sprocket shift)
24  |   |   == loop until no more shift demands in table entry
25  |   |   |   -- if (demand is for shift to smaller sprocket)
26  |   |   |   |   - perform (Shift Actuation - rear, smaller)
27  |   |   |   -- else
28  |   |   |   |   - perform (Shift Actuation - rear, larger)
29  |   |   |   -- end if
30  |   |   -- end loop
31  |   -- end if
32  -- end of module
```

Appendix G - Shift Actuation Module

```
1   -- Shift Actuation Module                              P-301RAE 77
2   |
3   |   { This module is used for both front and rear shifters and is
4   |     called upon for whichever shifter needs actuating. For some
5   |     shifting situations both shifters must be actuated. This module
6   |     is applied to each in sequence. }
7   |
8   |   -- if (demand is for larger sprocket)
9   |   |    == repeat
10  |   |    |   - move actuator toward next larger sprocket
11  |   |    |   - compare desired position with present position
12  |   |    -- until shifter is in desired position
13  |   -- else if (demand is for smaller sprocket)
14  |   |    == repeat
15  |   |    |   - move actuator toward next smaller sprocket
16  |   |    |   - compare desired position with present position
17  |   |    -- until shifter is in desired position
18  |   -- end if
19  -- end of module
```

Appendix H - User Request Module  P-301 RAE 78

```
1    -- User Request Module
2    |
3    |   { Take care of pushed switches, including the manual
4    |     override of the automatic shifter. When the controller
5    |     is in ready mode, the use of Up and Down switches will
6    |     indicate an immediate shift to the next speed ratio. }
7    |
8    |   -- if (Configure switch is actuated)
9    |   |   - turn off Ready indicator
10   |   |   - perform (Shifter Configuration)
11   |   |   - turn on Ready indicator
12   |   -- else if (Up switch is actuated)
13   |   |   - perform (Shifter Control - higher speed ratio)
14   |   -- else if (Down switch is actuated)
15   |   |   - perform (Shifter Control - lower speed ratio)
16   |   -- end if
17   -- end of module
```

What is claimed is:

1. An automatic speed range shifter for a velocipede having a traction wheel, a manually actuated pedal crank, a drive train between the pedal crank and the traction wheel and a ratio-changing transmission operatively connected in said drive train and a control member for upshifting and downshifting the speed range of the transmission, said shifter comprising:

speed sensing means for generating an electrical speed signal corresponding to the rotational speed of said pedal crank, force sensing means for generating an electrical force signal corresponding to the force applied to said pedal crank, a servo motor coupled with said control member, a microcomputer including a stored control program for controlling said servo motor and having inputs coupled with said speed sensing means and said force sensing means, said microcomputer having an output coupled with said servo motor, said microcomputer being operative under program control to produce upshift and downshift control signals in response to said speed and force signals to control energization of said servo motor to upshift said transmission in response to said speed signal exceeding a predetermined value and to downshift in response to said force signal exceeding a predetermined value.

2. The invention as defined in claim 1 including means for preventing energization of said servo motor to upshift said transmission until the average value of said speed signal exceeds said predetermined value for a predetermined time interval.

3. The invention as defined in claim 2 including:

means for producing an upshift control signal when the rate of change of said speed signal exceeds a predetermined value.

4. The invention as defined in claim 1 including:

means for preventing energization of said servo motor to downshift said transmission until the average value of said force signal exceeds said predetermined force value for a predetermined time interval.

5. The invention as defined in claim 4 including:

means for producing a downshift control signal when the rate of change of said force signal exceeds a predetermined value.

6. The invention as defined in claim 1 including:

means for inhibiting the energization of said servo motor in response to said force signal until said speed signal exceeds a predetermined value.

\* \* \* \* \*